(12) United States Patent
Miyata

(10) Patent No.: US 9,148,794 B2
(45) Date of Patent: Sep. 29, 2015

(54) COMMUNICATION APPARATUS AND COMMUNICATION METHOD

(75) Inventor: Takeo Miyata, Yokohama (JP)

(73) Assignee: KYOCERA Corporation, Kyoto (JP)

(*) Notice: Subject to any disclaimer, the term of this patent is extended or adjusted under 35 U.S.C. 154(b) by 161 days.

(21) Appl. No.: 13/989,183

(22) PCT Filed: Nov. 24, 2011

(86) PCT No.: PCT/JP2011/077001
§ 371 (c)(1),
(2), (4) Date: May 23, 2013

(87) PCT Pub. No.: WO2012/070602
PCT Pub. Date: May 31, 2012

(65) Prior Publication Data
US 2013/0242797 A1    Sep. 19, 2013

(30) Foreign Application Priority Data
Nov. 26, 2010  (JP) .................. 2010-263508

(51) Int. Cl.
*H04W 16/28*  (2009.01)
*H04B 7/06*   (2006.01)
*H04B 7/04*   (2006.01)

(52) U.S. Cl.
CPC ............. *H04W 16/28* (2013.01); *H04B 7/0617* (2013.01); *H04B 7/043* (2013.01)

(58) Field of Classification Search
CPC ...... H04W 16/28; H04B 7/0617; H04B 7/043
See application file for complete search history.

(56) References Cited

U.S. PATENT DOCUMENTS

| 7,020,701 | B1* | 3/2006 | Gelvin et al. ............. 709/224 |
| 2004/0125867 | A1 | 7/2004 | Tong et al. |
| 2008/0075037 | A1* | 3/2008 | Guo et al. ............... 370/329 |
| 2010/0135273 | A1 | 6/2010 | Kim |
| 2010/0148940 | A1* | 6/2010 | Gelvin et al. ........... 340/286.02 |
| 2011/0243262 | A1* | 10/2011 | Ratasuk et al. ............. 375/260 |
| 2011/0287728 | A1* | 11/2011 | Kenington ............. 455/226.1 |
| 2012/0008489 | A1 | 1/2012 | Higuchi et al. |

FOREIGN PATENT DOCUMENTS

| CN | 1489416 A | 4/2004 |
| JP | 2001-268633 A | 9/2001 |

(Continued)

OTHER PUBLICATIONS

International Search Report dated Jan. 10, 2012, issued for International Application No. PCT/JP2011/077001.

(Continued)

*Primary Examiner* — Brian D Nguyen
(74) *Attorney, Agent, or Firm* — Procopio, Cory, Hargreaves & Savitch LLP

(57) ABSTRACT

Upon receipt of sounding signals from a plurality of communication devices including a communication partner device, an evaluation value processing unit calculates an evaluation value indicative of a characteristic of a transmission path based on the sounding signals from the plurality of communication devices. A transmission scheme setting unit sets, based on the evaluation value, adaptive array transmission that achieves both null steering and beamforming or beamforming dedicated transmission as a transmission scheme to the communication partner device.

18 Claims, 21 Drawing Sheets

(56) References Cited

FOREIGN PATENT DOCUMENTS

| JP | 2004-112058 A | 4/2004 |
| JP | 2004-297276 A | 10/2004 |
| JP | 2007-312205 A | 11/2007 |
| JP | 2010-520699 A | 6/2010 |
| JP | 2010-206476 A | 9/2010 |

OTHER PUBLICATIONS

Office Action dated Feb. 3, 2015 issued in counterpart Chinese Application No. 201180056460.0.

* cited by examiner

FIG.5
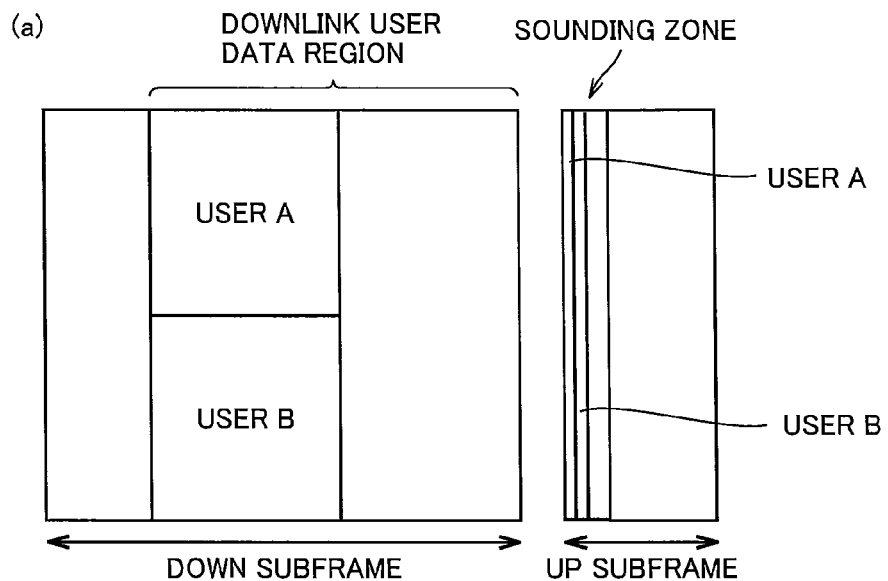
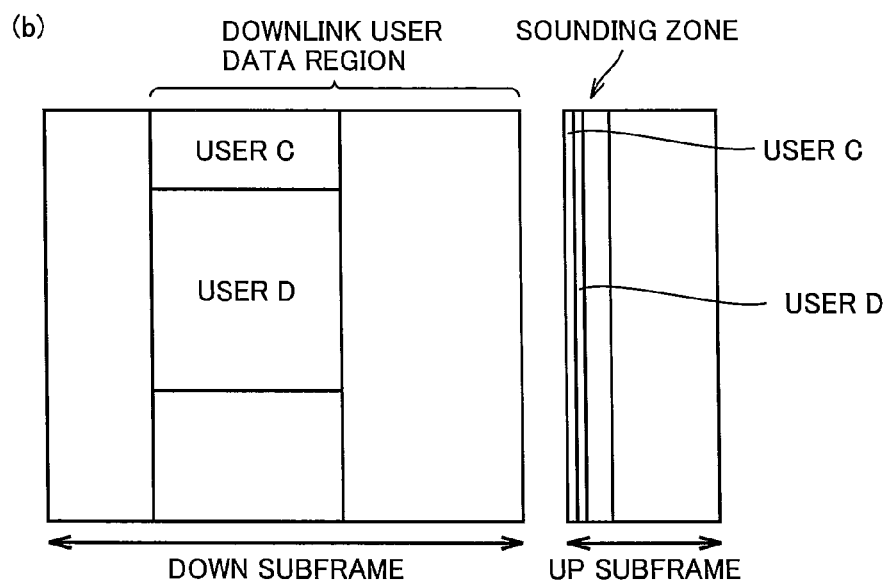

COMMUNICATION APPARATUS AND COMMUNICATION METHOD

TECHNICAL FIELD

The present invention relates to a communication apparatus and a communication method, and more particularly relates to a communication apparatus capable of conducting adaptive array communication and a communication method for such a communication apparatus.

BACKGROUND ART

In adaptive array transmission conducted by a base station practically applied to PHS (Personal Handy-phone System) and XGP (eXtended Global Platform), control is exerted which conducts beamforming transmission toward a desired terminal to strengthen radio waves and conducts null steering transmission toward an interfering terminal to weaken radio waves (for example, refer to Patent Document 1 (Japanese Patent Laying-Open No. 2004-297276)).

Accordingly, improved frequency utilization efficiency is achieved. Application of such an adaptive array communication technique is being studied for TD-LTE (Long Term Evolution) and WiMAX (Worldwide Interoperability for Microwave Access).

CITATION LIST

Patent Document

PTD 1: Japanese Patent Laying-Open No. 2004-297276

SUMMARY OF INVENTION

Technical Problem

It is useful to reduce interference by conducting the above-mentioned null steering transmission against interference from another cell. In adaptive array transmission, however, the effect of null steering transmission is not obtained in some cases due to its principle. Specifically, in an exemplary case, propagation path variation information (information such as response vector) between a base station and a desired terminal is highly correlated with propagation path information between the base station and an interfering terminal, and if beamforming is conducted toward a desired wave, beamforming transmission is also conducted toward an interference wave. This problem occurs even when the desired terminal and the interfering terminal are not identical in oncoming direction. In such a case, it is difficult to simultaneously conduct null steering transmission and beamforming transmission, with the result that the effect of adaptive array transmission, that is, beam gain and null gain are degraded.

In the case of PHS, interference can be avoided by assigning a different time or a different frequency slot to each terminal user. Since an interference measurement technique such as carrier sense measurement has not been established for WiMAX and LTE, an avoidance behavior similar to that in PHS is difficult to take, and a user of another base station cannot be controlled from a station of concern. Therefore, the only measure that can be taken is to control transmission in the station of concern not to interfere with another user.

It is therefore an object of the present invention to provide a communication apparatus and a communication method that prevent beamforming gain from being degraded by not conducting null steering transmission if the effect of null steering transmission to an interfering terminal is not obtained.

Solution to Problem

In order to solve the above-described problems, a communication apparatus of the present invention includes an evaluation value processing unit configured to calculate, upon receipt of known signals from a plurality of communication devices including a communication partner device, an evaluation value indicative of a characteristic of a transmission path based on the known signals from the plurality of communication devices, and a transmission scheme setting unit configured to set, based on the evaluation value, one of adaptive array transmission that achieves both null steering and beamforming and beamforming dedicated transmission as a transmission scheme to the communication partner device.

Advantageous Effects of Invention

According to the present invention, beamforming gain can be prevented from being degraded by not conducting null steering transmission if the effect of null steering transmission to an interfering terminal is not obtained.

BRIEF DESCRIPTION OF DRAWINGS

FIG. 5 represents at (a) an OFDMA frame transmitted/received to/from a wireless base station #1 of FIG. 4, and represents at (b) an OFDMA frame transmitted/received to/from a wireless base station #2 of FIG. 4.

DESCRIPTION OF EMBODIMENTS

Embodiments of the present invention will be described hereinafter with reference to the drawings.

Figure 1:
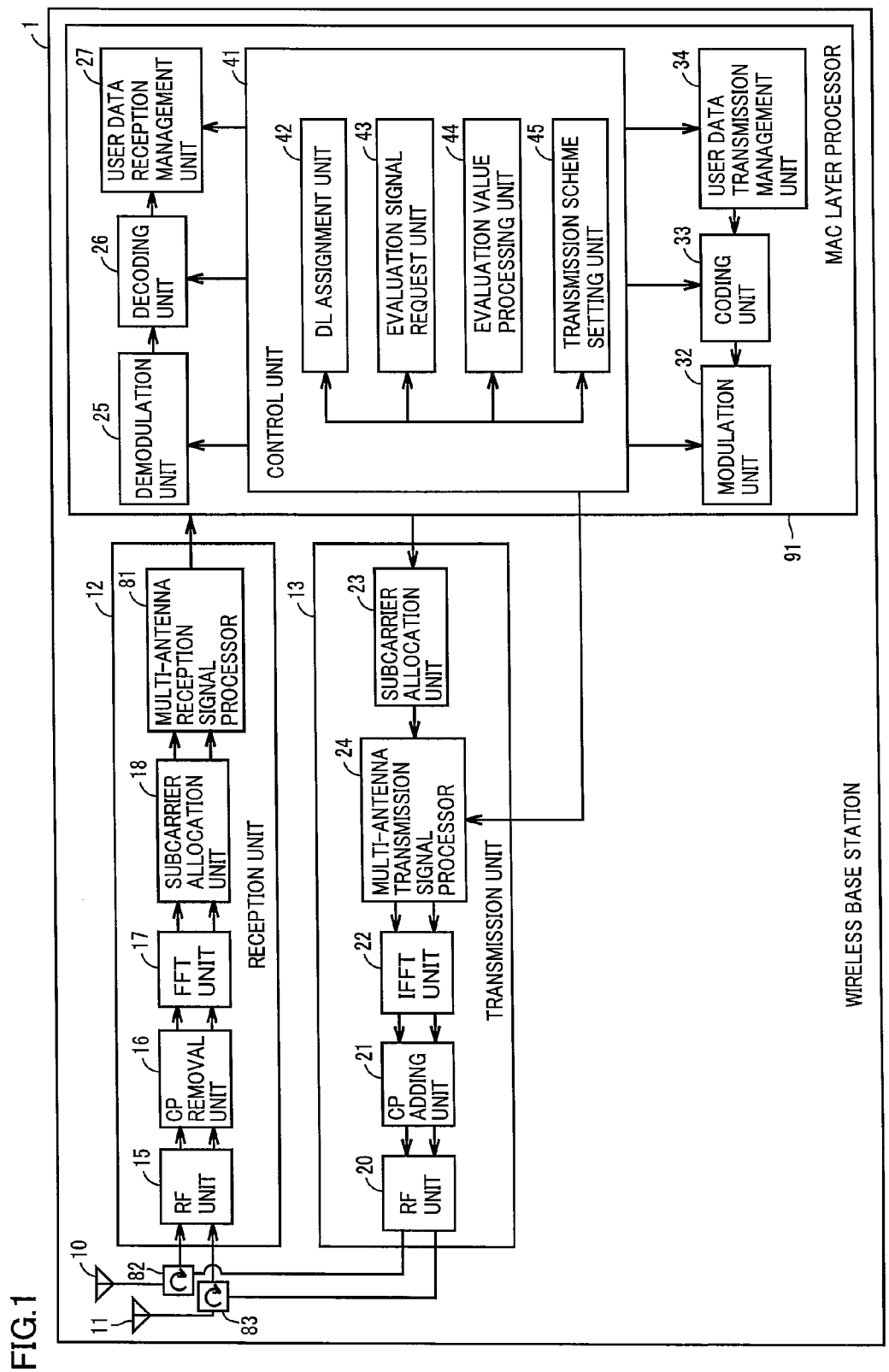
FIG. 1 represents a configuration of a wireless base station according to a first embodiment.

First Embodiment (Configuration of Wireless Base Station)
FIG. 1 represents a configuration of a wireless base station (communication apparatus) according to the first embodiment.

The communication scheme between this wireless base station 1 and a wireless terminal conforms to an OFDMA communication scheme (Orthogonal Frequency Division Multiple Access). In the OFDMA communication scheme, an OFDMA frame is transmitted.

Figure 2:
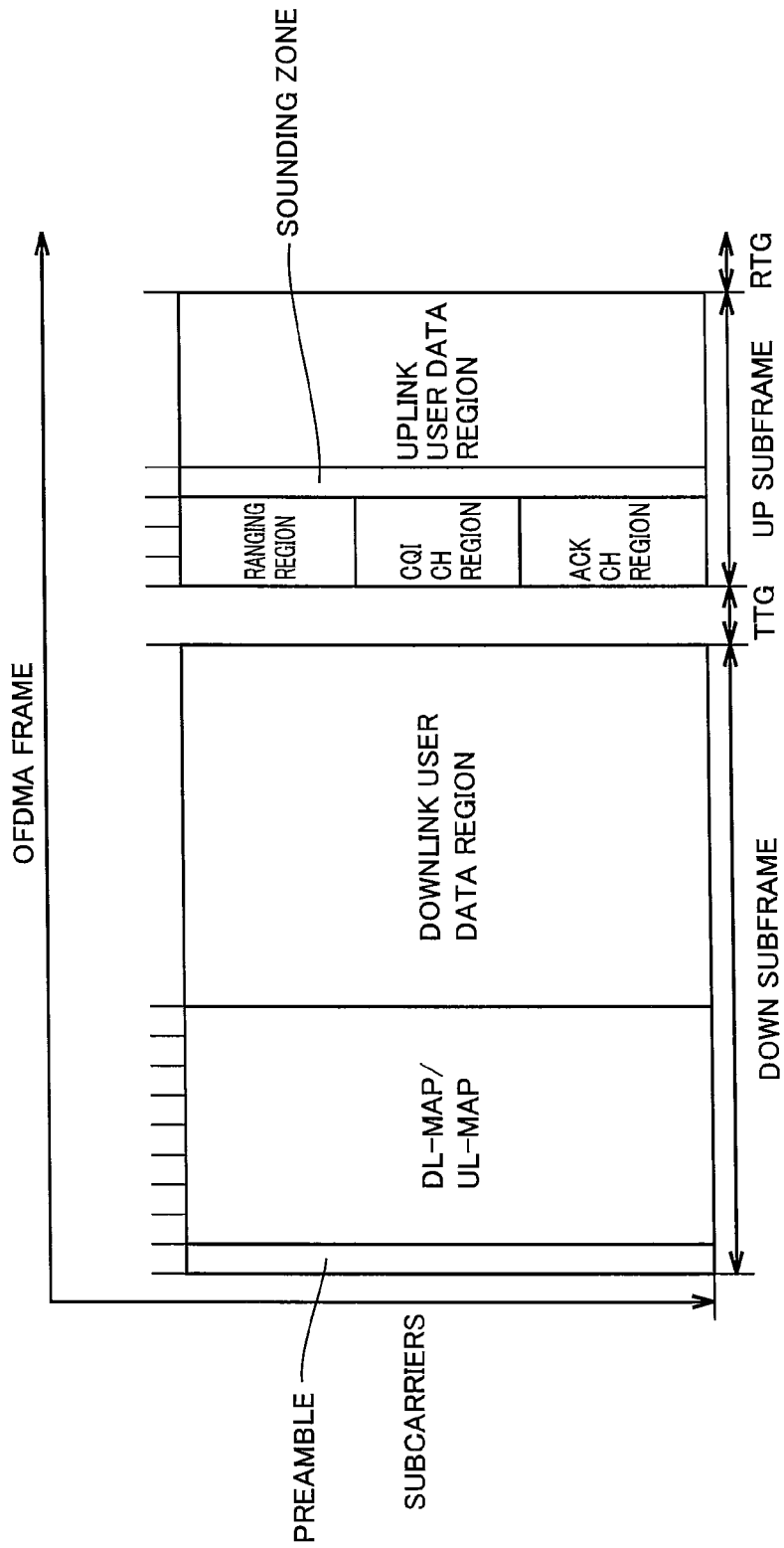
FIG. 2 represents a configuration of an OFDMA frame.

(OFDMA Frame)
FIG. 2 represents a configuration of an OFDMA frame.

Referring to FIG. 2, an OFDMA frame includes a down subframe and an up subframe.

The down subframe includes a preamble, a DL-MAP, an UL-MAP, and a downlink user data region.

The preamble has a known signal arranged so as to establish synchronization and the like.

DL-MAP (Downlink Map) has allocation information of a downlink wireless resource arranged. For example, information on the downlink user data region and the like is arranged in DL-MAP.

UL-MAP (Uplink Map) has allocation information of an upstream wireless resource arranged. For example, information on an uplink user data region and the like is arranged in UL-MAP.

The downlink user data region has downstream user data arranged. The downlink user data region is composed of a plurality of slots.

The up subframe includes a ranging region, a CQICH (channel quality information channel) region, an ACKCH (Acknowledgement Channel) region, a sounding zone, and an uplink user data region.

A ranging signal is arranged in the ranging region.

A signal representing the channel quality is arranged in the CQICH region.

A signal representing the channel acknowledgement is arranged in the ACKCH region.

A sounding signal (known signal) for estimating the state of a propagation path between a wireless base station and a wireless terminal is arranged in the sounding zone. The sounding signal from each wireless terminal arranged in the sounding zone is often divided by time, frequency or code.

Upstream user data is arranged in the uplink user data region.

Referring to FIG. 1, wireless base station 1 includes a first antenna 10, a second antenna 11, circulators 82, 83, a transmission unit 13, a reception unit 12, and an MAC (Media Access Control) layer processor 91.

Transmission unit 13 includes a multi-antenna transmission signal processor 24, a subcarrier allocation unit 23, an IFFT (Inverse First Fourier Transform) unit 22, a CP (Cyclic Prefix) adding unit 21, and an RF (Radio Frequency) unit 20.

Subcarrier allocation unit 23 allocates a subcarrier based on, for example, PUSC (Partial Usage of Subchannels).

When an adaptive array transmission scheme that achieves both null steering and beamforming is designated, multi-antenna transmission signal processor 24 obtains a response vector of a propagation path based on an algorithm using RLS (Recursive Least Squares), LMS (Least Mean Square) or SMI (Sample Matrix Inversion) based on MMSE (Minimum Mean Square Error), or the like, thereby conducting adaptive array transmission.

When a beamforming dedicated transmission scheme not including null steering is designated, multi-antenna transmission signal processor 24 calculates a transmission weight specializing in desired wave information based on an algorithm using MRT (Maximum Ratio Transmission), SVD (Singular Value Decomposition), EBB (Eigenvalue Based Beamforming), or the like, thereby conducting beamforming dedicated communication. MRT is described in a document ("Mobile Communications", Ohmsha, Ltd., written and edited by Hideichi Sasaoka). SVD is described in a document ("Intelligible MIMO System Technique", Ohmsha, Ltd., written by Takeo Ohgane and Yasutaka Ogawa).

IFFT unit 22 converts a plurality of subcarrier signals (signals in the frequency range) output from multi-antenna transmission signal processor 24 into a signal of the time region (OFDMA symbol) by IFFT.

CP adding unit 21 adds a signal equivalent to the tail of the OFDMA symbol to the head of the OFDMA symbol as the CP.

RF unit 20 includes an up converter for up-converting a radio frequency band, a power amplification circuit amplifying an up-converted signal, and a bandpass filter for passing only the signal component of a desired band among the amplified signals for output to first antenna 10 and second antenna 11 via circulators 82, 83, and the like.

Reception unit 12 includes an RF unit 15, a CP removal unit 16, a FFT unit 17, a subcarrier allocation unit 18, and a multi-antenna reception signal processor 81.

RF unit 15 includes a bandpass filter passing through only the signal component of a desired band among signals output from first antenna 10 and second antenna 11 via circulators 82, 83, a low-noise amplification circuit amplifying an RF signal, a down converter for down-converting an RF signal, and the like.

CP removal unit 16 removes the CP from the signal output from RF unit 15.

FFT unit 17 converts the signal in the time region output from CP removal unit 16 into a signal in the frequency range by FFT for demodulation of a plurality of subcarriers.

Subcarrier allocation unit 18 extracts each subcarrier output from FFT unit 17 based on, for example, PUSC.

When adaptive array reception is instructed, multi-antenna reception signal processor 81 subjects a signal output from subcarrier allocation unit 18 to adaptive array reception processing.

MAC layer processor 91 includes a user data transmission management unit 34, a coding unit 33, a modulation unit 32, a demodulation unit 25, a decoding unit 26, a user data reception management unit 27, and a control unit 41.

User data transmission management unit 34 manages the user data transmitted to a wireless terminal.

Coding unit 33 encodes a downlink signal.

Modulation unit 32 modulates the downlink signal to the wireless terminal.

Demodulation unit 25 demodulates an uplink signal from the wireless terminal.

Decoding unit 26 decodes the modulated uplink signal.

User data reception management unit 27 manages user data received from the wireless terminal.

Control unit 41 includes a DL assignment unit 42, an evaluation signal request unit 43, an evaluation value processing unit 44, and a transmission scheme setting unit 45.

DL assignment unit 42 temporarily assigns any location in the downlink user data region to a new user (terminal) requesting downlink communication.

Evaluation signal request unit 43 instructs the new user to transmit a sounding signal (known signal) including frequencies (subcarriers) including at least some frequencies (subcarriers) of the temporarily assigned downlink user data region. Evaluation signal request unit 43 receives the sounding signal including the instructed frequencies (subcarriers) continuously transmitted by the new user in the uplink sounding zone. If a user (terminal) communicating with a station of concern and/or another wireless base station is continuously transmitting the sounding signal in the sounding zone, evaluation signal request unit 43 receives this.

Evaluation value processing unit 44 extracts a reception response vector from the received sounding signal. Evaluation value processing unit 44 sequentially selects users to be paired with the new user from among a plurality of terminals as transmission sources of sounding signals.

Evaluation value processing unit 44 calculates the reception response vector of the sounding signal transmitted with a plurality of subcarriers (for example, four consecutive subcarriers) in the sounding zone from the wireless terminal of one user constituting the pair (referred to as a user X) and the reception response vector of the sounding signal transmitted with a plurality of subcarriers in the sounding zone from the wireless terminal of the other user constituting the pair (referred to as a user Y).

A reception signal $X1(t)$ in the plurality of subcarriers in the sounding zone received at first antenna 10 and a reception signal $X2(t)$ in the plurality of subcarriers in the sounding zone received at second antenna 11 are represented by Equations (1) and (2) set forth below using a sounding signal $S1(t)$ in the plurality of subcarriers in the sounding zone transmitted from the wireless terminal of user X, a sounding signal $S2(t)$ in the plurality of subcarriers in the sounding zone transmitted from the wireless terminal of user Y, a reception response vector H1 $(=[h11, h21]^T)$ of the sounding signal in the plurality of subcarriers in the sounding zone from the wireless terminal of user X, and a reception response vector H2 $(=[h12, h22]^T)$ of the sounding signal in the plurality of subcarriers from the wireless terminal of user Y.

$$X1(t)=h11 \times S1(t)+h12 \times S2(t)+N1(t) \tag{1}$$

$$X2(t)=h21 \times S1(t)+h22 \times S2(t)+N2(t) \tag{2}$$

where $N1(t)$ is the noise component included in reception signal $X1(t)$ received at first antenna 10, and $N2(t)$ is the noise component included in reception signal $X2(t)$ received at second antenna 11.

Evaluation value processing unit 44 calculates, according to Equations (3) and (4) set forth below, reception response vector H1 of the sounding signal in the plurality of subcarriers in the sounding zone from the wireless terminal of user X and reception response vector H2 of the sounding signal in the plurality of subcarriers in the sounding zone from the wireless terminal of user Y.

$$H1=[h11,h21]^T=[E[X1(t)U1^*(t)],E[X2(t)U1^*(t)]]^T \tag{3}$$

$$H2=[h12,h22]^T=[E[X1(t)U2^*(t)],E[X2(t)U2^*(t)]]^T \tag{4}$$

where $U1(t)$ is a signal identical to $S1(t)$ held on part of the wireless base station side, and $U2(t)$ is a signal identical to $S2(t)$ held on part of the wireless base station side. $U1^*(t)$ is the complex conjugate of $U1(t)$, $U2^*(t)$ is the complex conjugate of $U2(t)$, and E(X) represents the ensemble average (time average) of X. With respect to a vector A, $A^T$ represents a transposition of vector A.

Evaluation value processing unit 44 calculates, according to Equation (5) set forth below, a spatial correlation coefficient C from reception response vectors H1 and H2.

$$C=|(H1 \cdot H2)|/(|H1| \times |H2|) \tag{5}$$

where (X·Y) represents the inner product of vector X and vector Y, and |X| represents the magnitude of vector X.

Evaluation value processing unit 44 calculates an average spatial correlation coefficient M_SR that is the average of the calculated spatial correlation coefficient C for every plurality of subcarriers over all the subcarriers included in the sounding zone. For example, when the total number of subcarriers is 1024, evaluation value processing unit 44 obtains the spatial correlation coefficient C for every four continuous subcarriers, i.e. 256 spatial correlation coefficients C, and averages the 256 spatial correlation coefficients C to calculate average spatial correlation coefficient M_SR.

Evaluation value processing unit 44 calculates average spatial correlation coefficient M_SR as described above, for each of all the possible pairs. For all the possible pairs, evaluation value processing unit 44 specifies a pair presenting minimum average spatial correlation coefficient M_SR and a minimum value MINSR.

If minimum value MINSR is less than or equal to a threshold TH1, transmission scheme setting unit 45 instructs multi-antenna transmission signal processor 24 to make downlink communication with the new user under the adaptive array transmission scheme. If minimum value MINSR exceeds threshold TH1 and if the temporary assignment in the downlink user data region cannot be changed to another region, transmission scheme setting unit 45 instructs multi-antenna transmission signal processor 24 to make downlink communication with the new user under the beamforming dedicated transmission scheme.

If minimum value MINSR is less than or equal to a threshold TH1, DL assignment unit 42 formally assigns the temporarily assigned downlink user data region to the new user. If minimum value MINSR exceeds threshold TH1 and if the temporary assignment in the downlink user data region cannot be changed to another region, DL assignment unit 42 formally assigns the temporarily assigned downlink user data region to the new user. If minimum value MINSR exceeds threshold TH1 and if the temporary assignment in the downlink user data region can be changed to another region, DL assignment unit 42 changes the temporary assignment in the downlink user data region to the new user (terminal) requesting downlink communication to another region.

(Operation)

Figure 3:
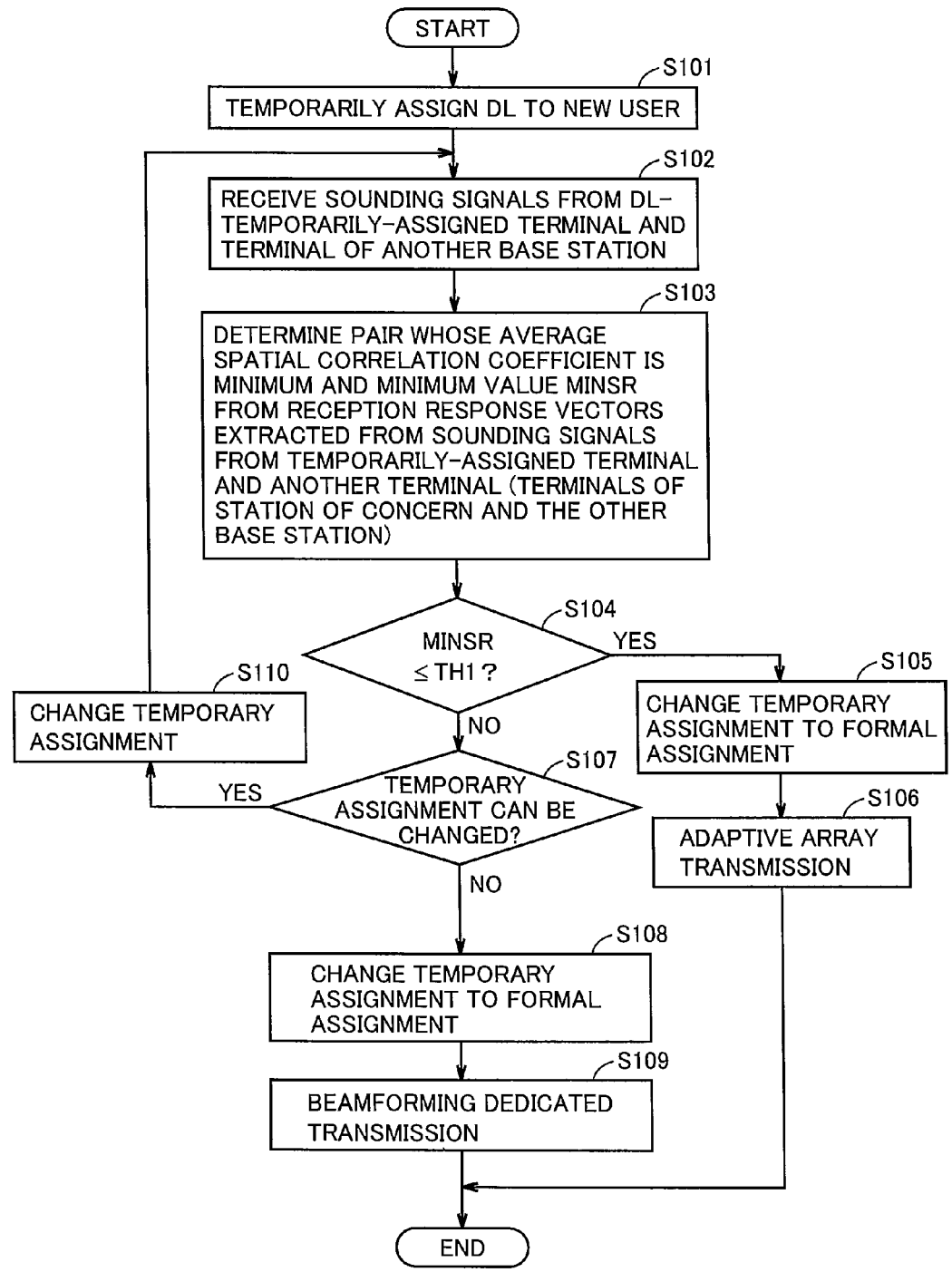
FIG. 3 is a flowchart showing a procedure for deciding a transmission scheme for downlink communication conducted by the wireless base station according to the first embodiment.

FIG. 3 is a flowchart showing a procedure for deciding a transmission scheme for downlink communication conducted by the wireless base station according to the first embodiment.

Referring to FIG. 3, DL assignment unit 42 first temporarily assigns any location in the downlink user data region to a new user (terminal) requesting downlink communication (step S101).

Next, evaluation signal request unit 43 instructs the new user to transmit the sounding signal including frequencies (subcarriers) including at least some of the frequencies (subcarriers) of the temporarily assigned downlink user data region. The new user continuously transmits the sounding signal including the instructed frequencies (subcarriers) in the uplink sounding zone, and evaluation signal request unit 43 receives this. If the user (terminal) communicating with a station of concern and/or another wireless base station is continuously transmitting the sounding signal in the sounding zone, evaluation signal request unit 43 receives this. It is noted that evaluation signal request unit 43 may instruct the user (terminal) communicating with the station of concern and/or another wireless base station to continuously transmit the sounding signal in the sounding zone.

Figure 4:
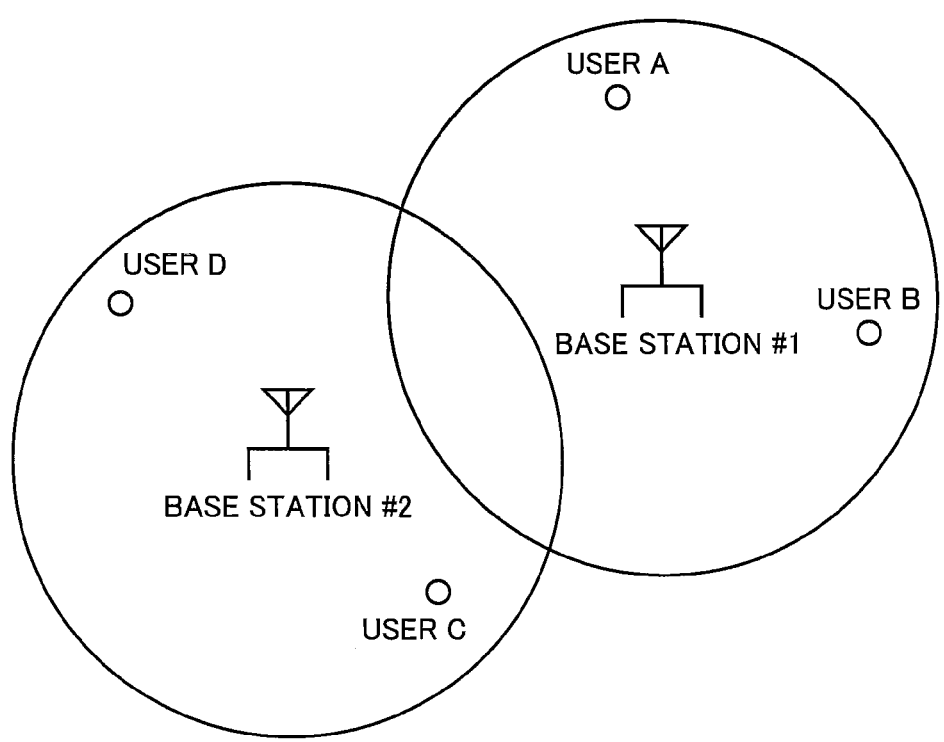
FIG. 4 represents an example of communication connection according to the first embodiment.

For example, as shown in FIG. 4, it is assumed that wireless base station #1 is communicating with a user A and wireless base station #2 is communicating with users C and D. It is assumed that a new user B has requested downlink communication from wireless base station #1.

FIG. 5 represents at (a) an OFDMA frame transmitted/received to/from wireless base station #1, and represents at (b) an OFDMA frame transmitted/received to/from wireless base station #2. Users A, C and D each transmit the sounding signal including at least some frequencies (subcarriers) of the frequencies (subcarriers) of the assigned downlink user data region, in the sounding zone of the up subframe. User B similarly transmits the sounding signal including at least some frequencies (subcarriers) of the frequencies (subcarriers) of the assigned downlink user data region, in the sounding zone of the up subframe. The wireless base station receives the sounding signal from each user (step S102).

Evaluation value processing unit 44 extracts the reception response vector from the sounding signal received at step S102. Evaluation value processing unit 44 selects users to be paired with the new user from among a plurality of terminals as transmission sources of sounding signals. For each pair, evaluation value processing unit 44 generates its reception response vector. Evaluation value processing unit 44 calculates spatial correlation coefficient C from the reception response vector. Evaluation value processing unit 44 calculates average spatial correlation coefficient M_SR that is the average of the calculated spatial correlation coefficient C for every plurality of subcarriers over all the subcarriers included in the sounding zone. For all the possible pairs, evaluation value processing unit 44 specifies a pair presenting minimum average spatial correlation coefficient M_SR and minimum value MINSR (step S103).

If minimum value MINSR specified at step S103 is less than or equal to threshold TH1 (YES at step S104), DL assignment unit 42 formally assigns the temporarily assigned downlink user data region to the new user (step S105). Then, transmission scheme setting unit 45 instructs multi-antenna transmission signal processor 24 to make downlink communication with the new user under the adaptive array transmission scheme. In this case, beam is directed to the new user, and null is directed to the other user of the pair specified at step S103.

Figure 6:
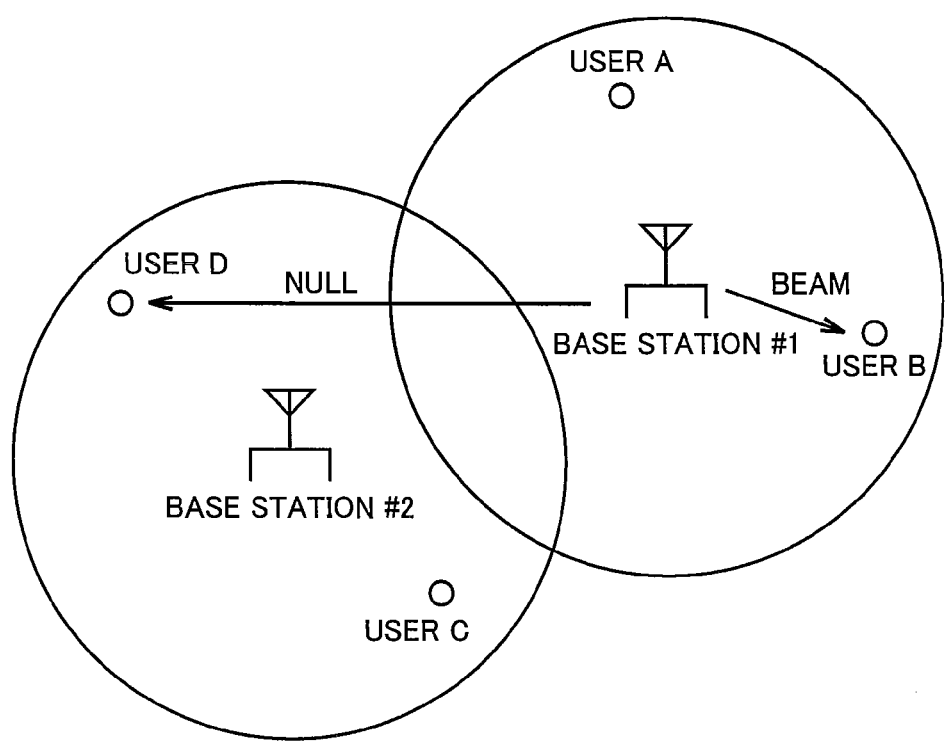
FIG. 6 represents an example of a transmission scheme of wireless base station #1 of FIG. 4.

If the pair of users B and D presents minimum average spatial correlation coefficient M_SR, as shown in FIG. 6, the adaptive array transmission scheme is set as the downlink communication scheme to user B, and beam is directed to user B and null is directed to user D (step S106).

If minimum value MINSR specified at step S103 exceeds threshold TH1 (NO at step S104) and if the temporary assignment in the downlink user data region cannot be changed to another region (NO at step S107), DL assignment unit 42 formally assigns the temporarily assigned downlink user data region to the new user (step S108). Then, transmission scheme setting unit 45 instructs multi-antenna transmission signal processor 24 to make downlink communication with the new user under the beamforming dedicated transmission scheme (step S109).

If minimum value MINSR specified at step S103 exceeds threshold TH1 (NO at step S104) and if the temporary assignment in the downlink user data region can be changed to another region (YES at step S107), DL assignment unit 42 changes the temporary assignment in the downlink user data region to another region (step S110).

(Effects)

As described above, the present embodiment recognizes a characteristic of a transmission path by the sounding signal (known signal) transmitted from a terminal, and if the effect of null steering transmission to an interfering terminal cannot be achieved, specializes in the beamforming dedicated transmission toward a desired terminal without conducting null steering transmission. Accordingly, performance degradation in a cell of concern can be avoided, and improved frequency utilization efficiency in the whole system can be achieved.

Second Embodiment

Configuration

Figure 7:
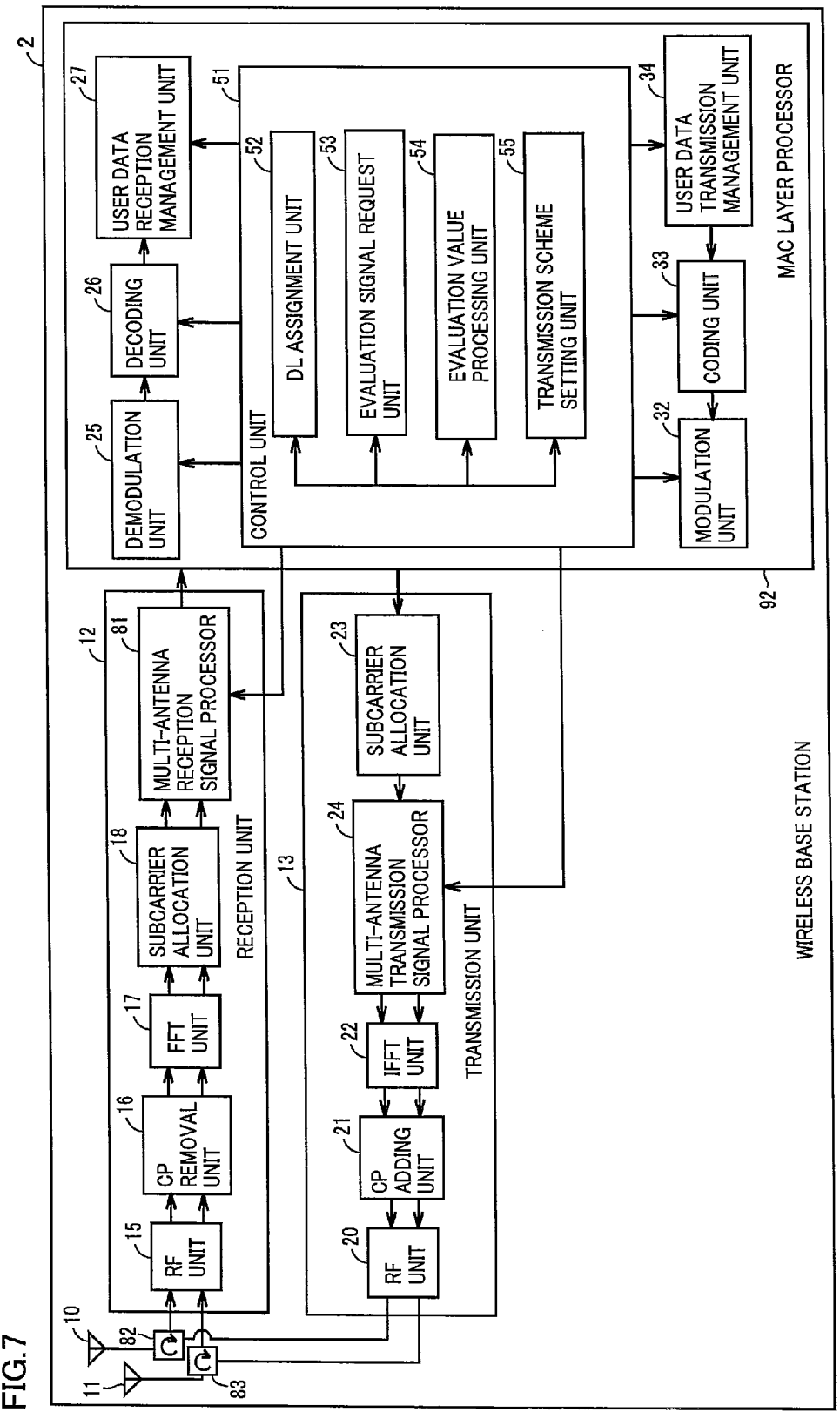
FIG. 7 represents a configuration of a wireless base station according to a second embodiment.

FIG. 7 represents a configuration of a wireless base station (communication apparatus) according to a second embodiment.

A wireless base station 2 of FIG. 7 is different from the wireless base station of FIG. 1 according to the first embodiment in the following points.

A control unit 51 includes a DL assignment unit 52, an evaluation signal request unit 53, an evaluation value processing unit 54, and a transmission scheme setting unit 55.

DL assignment unit 52 temporarily assigns any location in the downlink user data region to a new user (terminal) requesting downlink communication.

Evaluation signal request unit 53 instructs the new user to transmit an evaluation signal in the uplink user data region including the frequencies (subcarriers) including at least some of the frequencies (subcarriers) of the temporarily assigned downlink user data region. Evaluation signal request unit 53 receives the evaluation signal continuously transmitted by the new user in the instructed uplink user data region. If this uplink user data region has been assigned to users (terminals) communicating with a station of concern and/or another wireless base station, evaluation signal request unit 53 receives the evaluation signals transmitted by these users (terminals) as interference waves.

Evaluation value processing unit 54 calculates EVM (Error Vector Magnitude) from an IQ signal prior to subjecting the received evaluation signal to adaptive array reception processing in multi-antenna reception signal processor 81, and sets this to EVM1. EVM is obtained by normalizing a misalignment between an ideal modulation signal and a measured modulation signal with the ideal modulation signal in an IQ constellation. Evaluation value processing unit 54 calculates EVM from the IQ signal after subjecting the received evaluation signal to adaptive array reception processing in multi-antenna reception signal processor 81, and sets this to EVM2.

If the difference between EVM1 and EVM2 exceeds a threshold TH2, transmission scheme setting unit 55 instructs multi-antenna transmission signal processor 24 to make downlink communication with the new user under the adaptive array transmission scheme.

If the difference between EVM1 and EVM2 is less than or equal to TH2 and if the temporary assignment in the downlink user data region cannot be changed to another region, transmission scheme setting unit 55 instructs multi-antenna transmission signal processor 24 to make downlink communication with the new user under the beamforming dedicated transmission scheme.

If the difference between EVM1 and EVM2 exceeds threshold TH2, DL assignment unit 52 formally assigns the temporarily assigned downlink user data region to the new user.

If the difference between EVM1 and EVM2 is less than or equal to TH2 and if the temporary assignment in the downlink user data region cannot be changed to another region, DL assignment unit 52 formally assigns the temporarily assigned downlink user data region to the new user.

If the difference between EVM1 and EVM2 is less than or equal to TH2 and if the temporary assignment in the downlink user data region can be changed to another region, DL assignment unit 52 changes the temporarily assigned location in the downlink user data region for the new user (terminal) requesting downlink communication.

(Operation)

Figure 8:
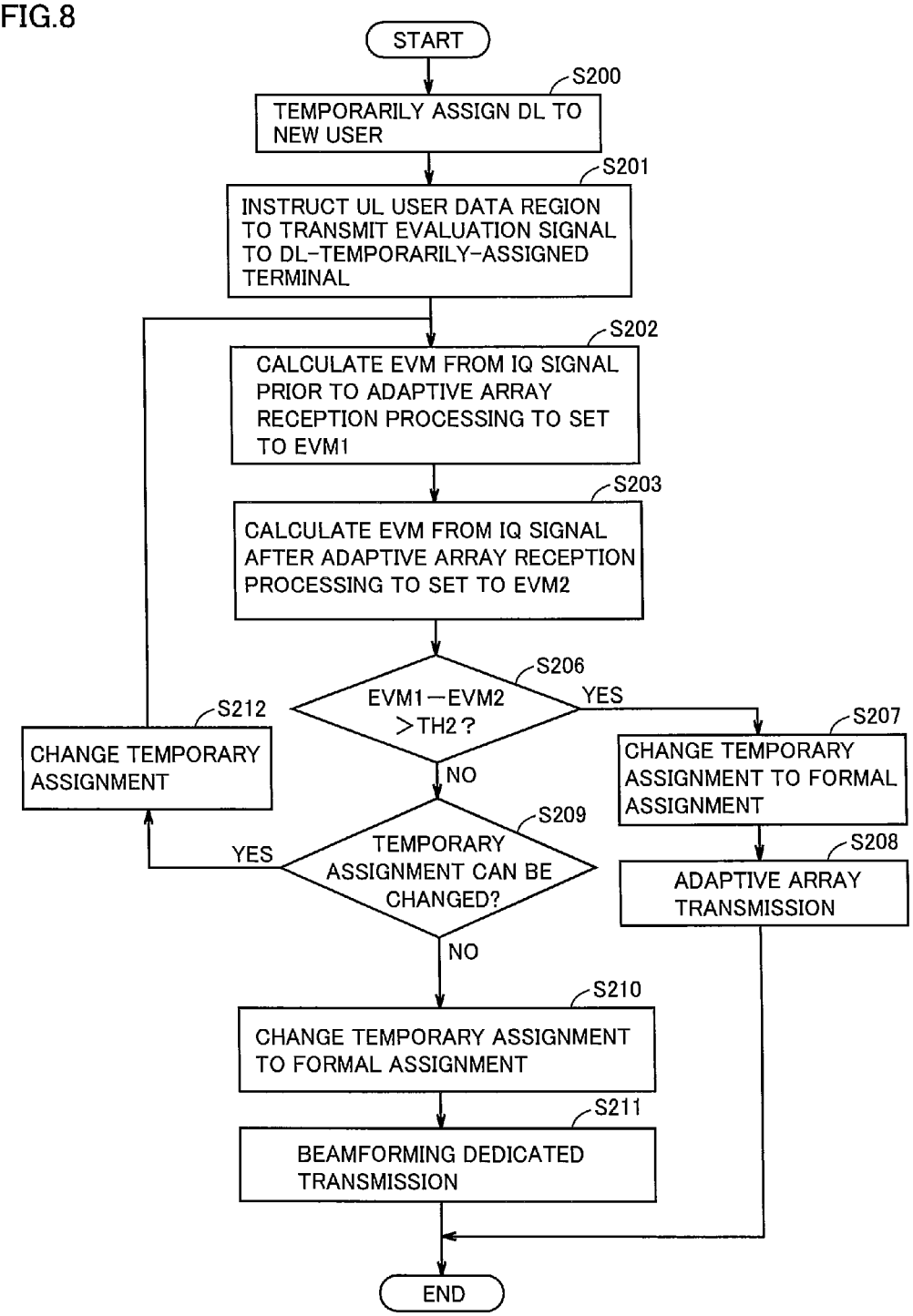
FIG. 8 is a flowchart showing a procedure for deciding a transmission scheme for downlink communication conducted by the wireless base station according to the second embodiment.

FIG. 8 is a flowchart showing a procedure for deciding a transmission scheme for downlink communication conducted by the wireless base station according to the second embodiment.

Referring to FIG. 8, DL assignment unit 52 first temporarily assigns any location in the downlink user data region to a new user (terminal) requesting downlink communication (step S200).

Next, evaluation signal request unit 53 instructs the new user to transmit an evaluation signal in the uplink user data region including at least some frequencies (subcarriers) of the frequencies (subcarriers) of the temporarily assigned downlink user data region.

The new user continuously transmits the evaluation signal in the instructed uplink user data region. If this uplink user data region has been assigned to users (terminals) communicating with a station of concern and/or another wireless base station, they continuously transmit the evaluation signals in this uplink user data region.

Figure 9:
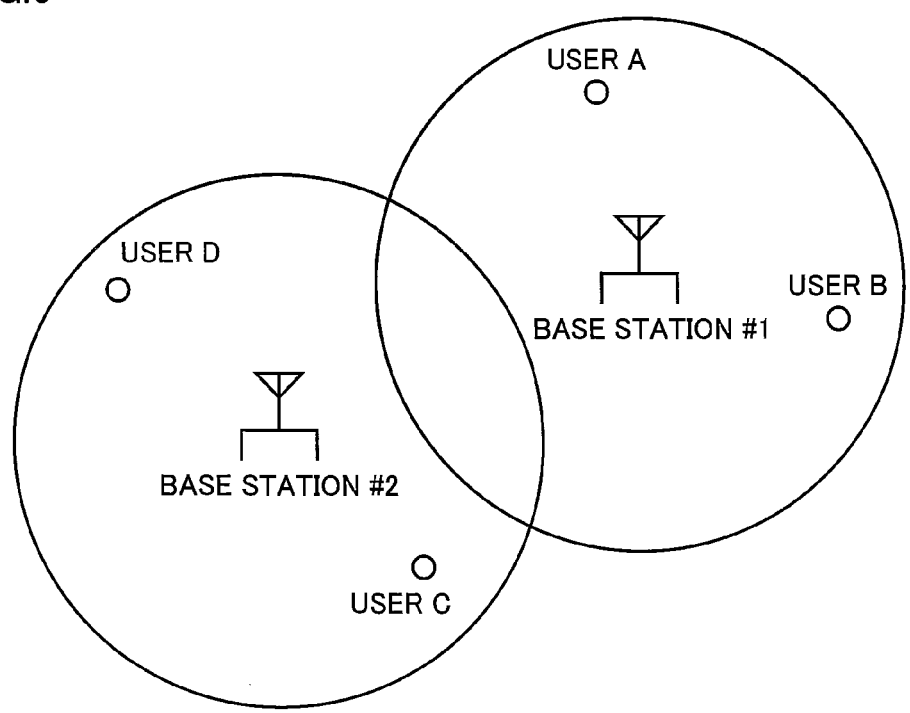
FIG. 9 represents an example of communication connection according to the second embodiment.

For example, as shown in FIG. 9, it is assumed that wireless base station #1 is communicating with user A and wireless base station #2 is communicating with users C and D. It is assumed that new user B has requested downlink communication from wireless base station #1.

Figure 10:
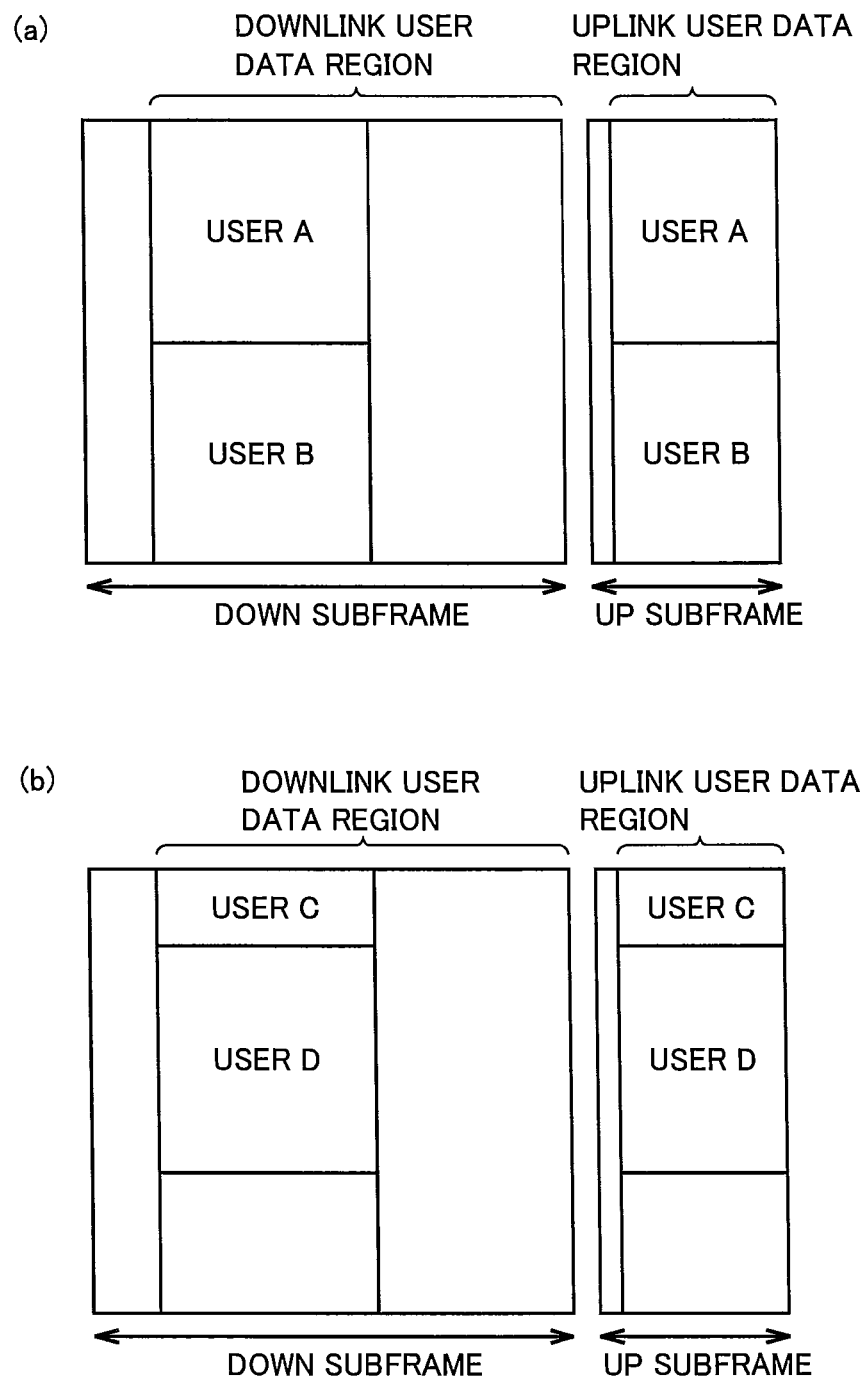
FIG. 10 represents at (a) an OFDMA frame transmitted/received to/from wireless base station #1 of FIG. 9, and represents at (b) an OFDMA frame transmitted/received to/from wireless base station #2 of FIG. 9.

FIG. 10 represents at (a) an OFDMA frame transmitted/received to/from wireless base station #1, and represents at (b) an OFDMA frame transmitted/received to/from wireless base station #2. Users A, C and D each transmit the evaluation signal in the uplink user data region including at least some frequencies (subcarriers) of the frequencies (subcarriers) of the assigned downlink user data region. User B similarly transmits the evaluation signal in the uplink user data region including at least some frequencies (subcarriers) of the frequencies (subcarriers) of the temporarily assigned downlink user data region (step S201).

Evaluation value processing unit 54 calculates EVM (Error Vector Magnitude) from an IQ signal prior to subjecting the received evaluation signal to adaptive array reception processing in multi-antenna reception signal processor 81, and sets this to EVM1 (step S202).

Next, evaluation value processing unit 54 calculates EVM from the IQ signal after subjecting the received evaluation signal to adaptive array reception processing in multi-antenna reception signal processor 81, and sets this to EVM2 (step S203).

If the difference between EVM1 and EVM2 exceeds threshold TH2 (YES at step S206), DL assignment unit 52 formally assigns the temporarily assigned downlink user data region to the new user (step S207). Then, transmission scheme setting unit 55 instructs multi-antenna transmission signal processor 24 to make downlink communication with the new user under the adaptive array transmission scheme.

Figure 11:
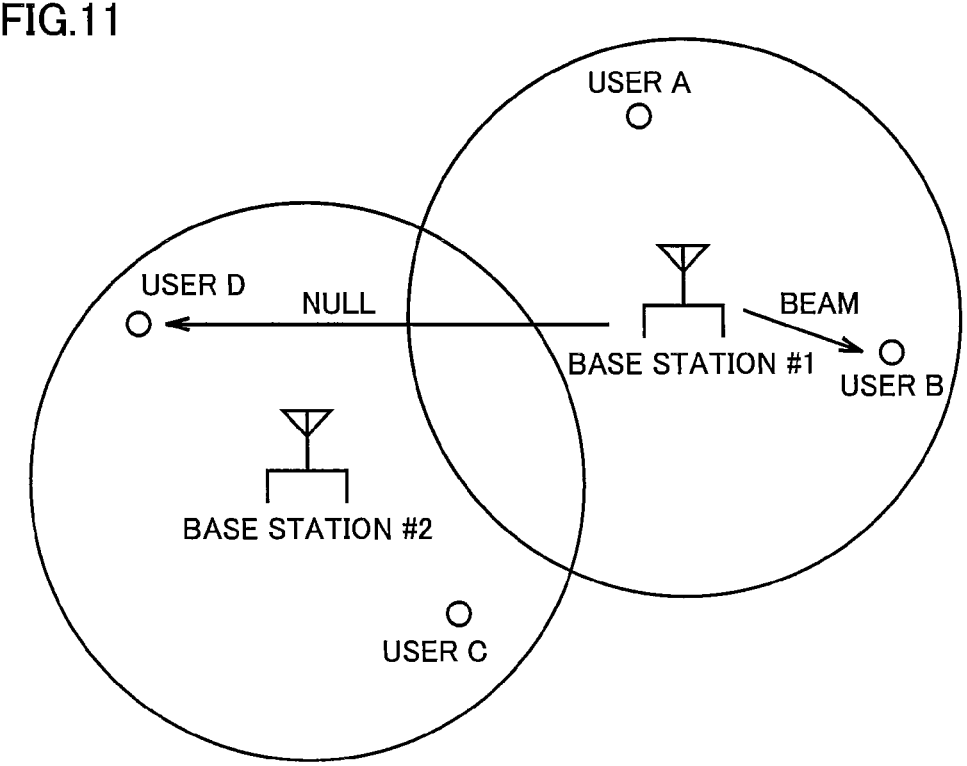
FIG. 11 represents an example of a transmission scheme of wireless base station #1 of FIG. 9.

If the difference between EVM1 and EVM2 exceeds threshold TH2, as shown in FIG. 11, the adaptive array transmission scheme is set as the downlink communication scheme to user B, and beam is directed to user B and null is directed to user D (step S208).

If the difference between EVM1 and EVM2 is less than or equal to TH2 (NO at step S206) and if the temporary assignment in the downlink user data region cannot be changed to another region (NO at step S209), DL assignment unit 52 formally assigns the temporarily assigned downlink user data region to the new user (step S210). Then, transmission scheme setting unit 55 instructs multi-antenna transmission signal processor 24 to make downlink communication with the new user under the beamforming dedicated transmission scheme (step S211).

If the difference between EVM1 and EVM2 is less than or equal to TH2 (NO at step S206) and if the temporary assignment in the downlink user data region can be changed to another region (YES at step S209), the temporary assignment in the downlink user data region is changed to another region (step S212).

(Effects)

As described above, the present embodiment recognizes the effects achieved by subjecting a signal transmitted from a terminal to adaptive array reception, and if the effect of null steering transmission to an interfering terminal cannot be achieved, specializes in the beamforming dedicated transmission toward a desired terminal without conducting null steering transmission. Accordingly, performance degradation in a cell of concern can be avoided, and improved frequency utilization efficiency in the whole system can be achieved.

Third Embodiment

Configuration

Figure 12:
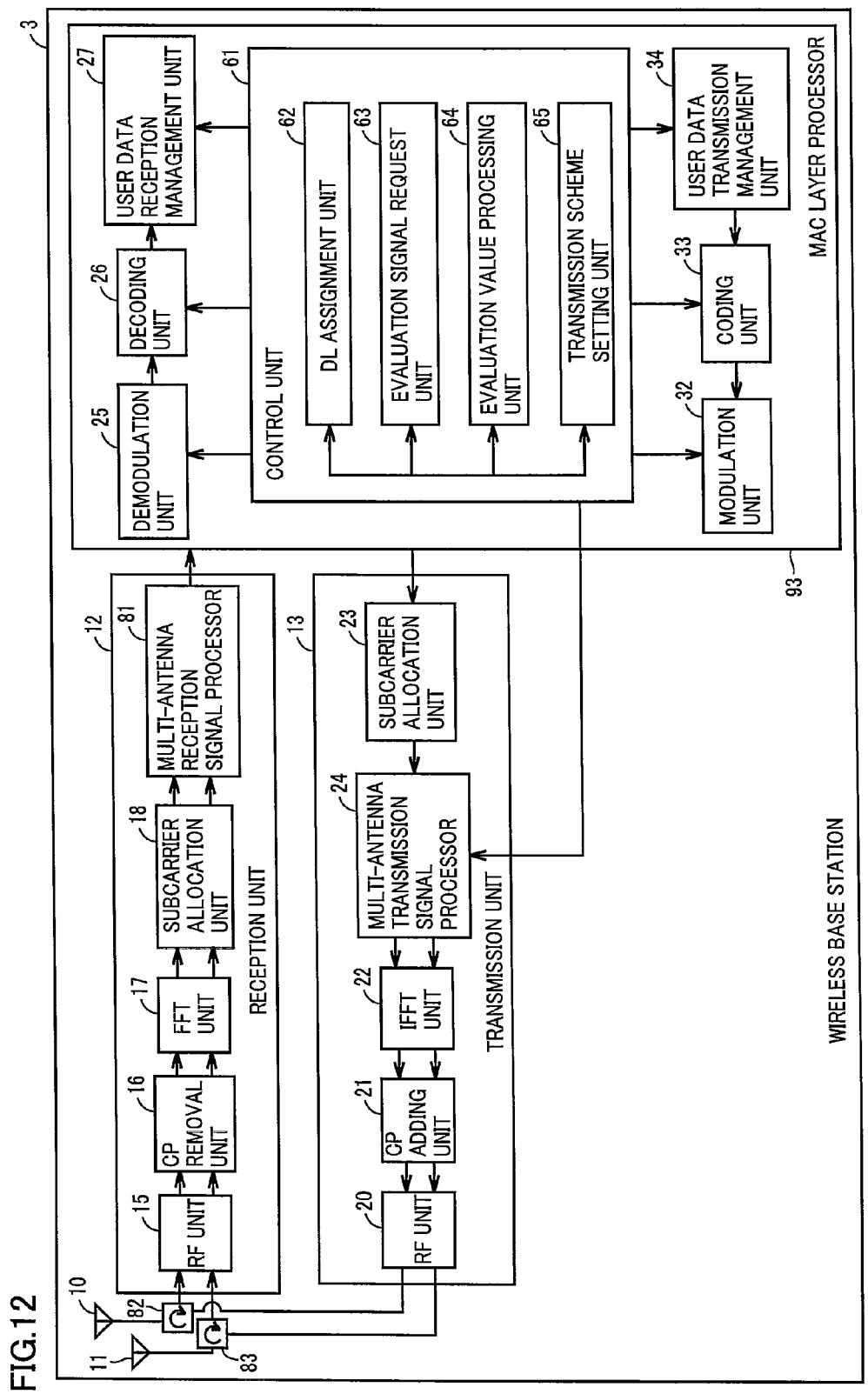
FIG. 12 represents a configuration of a wireless base station according to a third embodiment.

FIG. 12 represents a configuration of a wireless base station (communication apparatus) according to a third embodiment.

A wireless base station 3 of FIG. 12 is different from the wireless base station of FIG. 1 according to the first embodiment in the following points.

A control unit 61 includes a DL assignment unit 62, an evaluation signal request unit 63, an evaluation value processing unit 64, and a transmission scheme setting unit 65.

If a new user (terminal) requests downlink communication, DL assignment unit 62 assigns a downlink user data region to the new user and a user making communication by a downlink scheduling algorithm, such as proportional fairness.

Proportional fairness is a scheduling algorithm of changing the data volume to be assigned in accordance with the radio wave state of the transmission path with a wireless terminal, thereby assigning a slot so as to simultaneously achieve efficiency and fairness. With this algorithm, a large volume of data is transmitted to a wireless terminal which is in good environment. Transmission is thereby completed in a short time period, thereby achieving higher efficiency. Moreover, with reference to the history of transmission to the wireless terminal, priority is lowered to maintain fairness if a large volume of data has been transmitted in the past.

Evaluation signal request unit 63 instructs the new user and the user making communication to transmit a sounding signal including at least some frequencies (subcarriers) of the frequencies (subcarriers) of the assigned downlink user data region. The new user and the user making communication each continuously transmit the sounding signal including the instructed frequencies (subcarriers) in the uplink sounding zone, and evaluation signal request unit 63 receives this. If a user (terminal) communicating with another wireless base station is continuously transmitting the sounding signal in the sounding zone, evaluation signal request unit 63 receives this.

Evaluation value processing unit 64 extracts the reception response vector from the received sounding signal. Evaluation value processing unit 64 sequentially selects users to be paired with the selected user from among a plurality of terminals as transmission sources of sounding signals to specify minimum value MINSR of average spatial correlation coefficient M_SR of all the pairs, similarly to the first embodiment.

If minimum value MINSR is less than or equal to threshold TH1, transmission scheme setting unit 65 instructs multi-antenna transmission signal processor 24 to make downlink communication with the selected user under the adaptive array transmission scheme. If minimum value MINSR exceeds threshold TH1 and if the temporary assignment in the downlink user data region cannot be changed to another region, transmission scheme setting unit 65 instructs multi-antenna transmission signal processor 24 to make downlink communication with the selected user under the beamforming dedicated transmission scheme.

(Operation)

Figure 13:
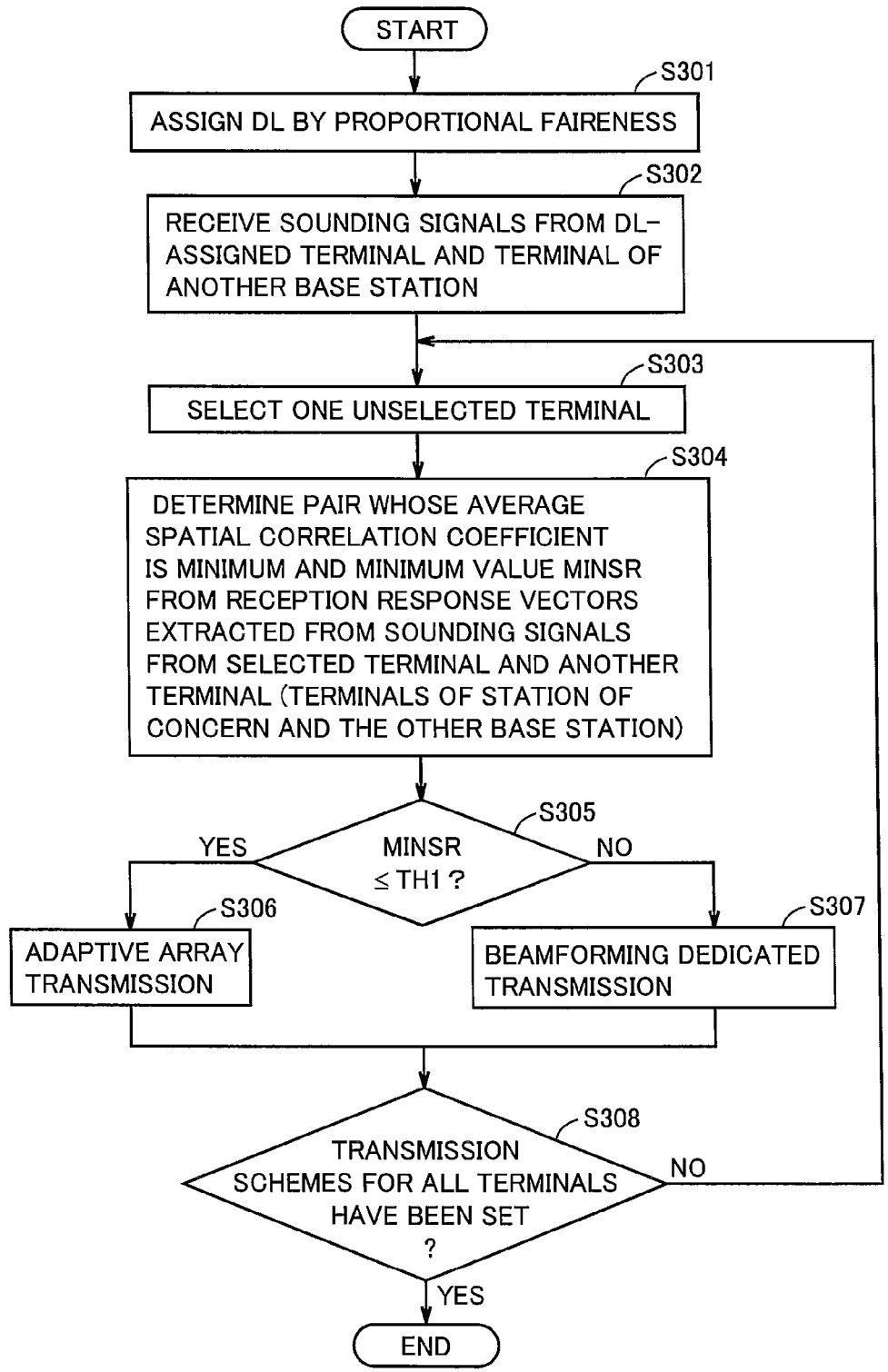
FIG. 13 is a flowchart showing a procedure for deciding a transmission scheme for downlink communication conducted by the wireless base station according to the third embodiment.

FIG. 13 is a flowchart showing a procedure for deciding a transmission scheme for downlink communication conducted by the wireless base station according to the third embodiment.

Referring to FIG. 13, if a new user (terminal) requests downlink communication, DL assignment unit 62 first assigns a downlink user data region to the new user and a user making communication by proportional fairness (step S301).

Next, evaluation signal request unit 63 instructs the new user and the user making communication to transmit the sounding signal including at least some frequencies (subcarriers) of the frequencies (subcarriers) of the assigned downlink user data region. The new user and the user making communication each continuously transmit the sounding signal including the instructed frequencies (subcarriers) in the uplink sounding zone, and evaluation signal request unit 63 receives this. If a user (terminal) communicating with another wireless base station is continuously transmitting the sounding signal in the sounding zone, evaluation signal request unit 63 receives this. It is noted that evaluation signal request unit 63 may instruct the user (terminal) communicating with the other wireless base station to continuously transmit the sounding signal in the sounding zone.

Figure 14:
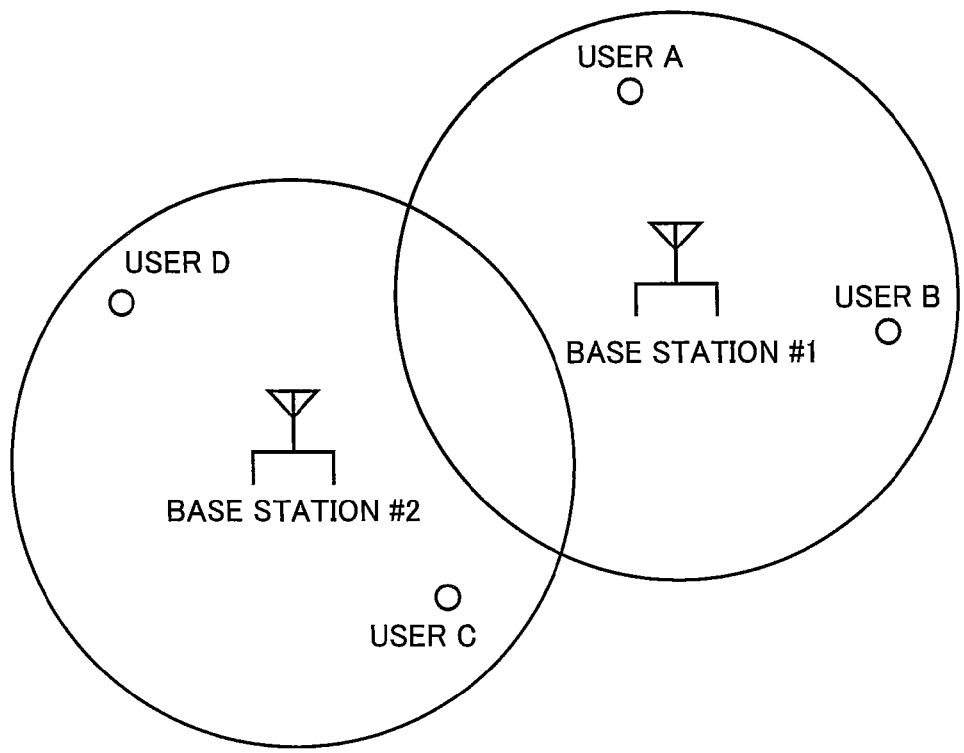
FIG. 14 represents an example of communication connection according to the third embodiment.

For example, as shown in FIG. 14, it is assumed that wireless base station #1 is communicating with user A and wireless base station #2 is communicating with users C and D. It is assumed that new user B has requested downlink communication from wireless base station #1.

Figure 15:
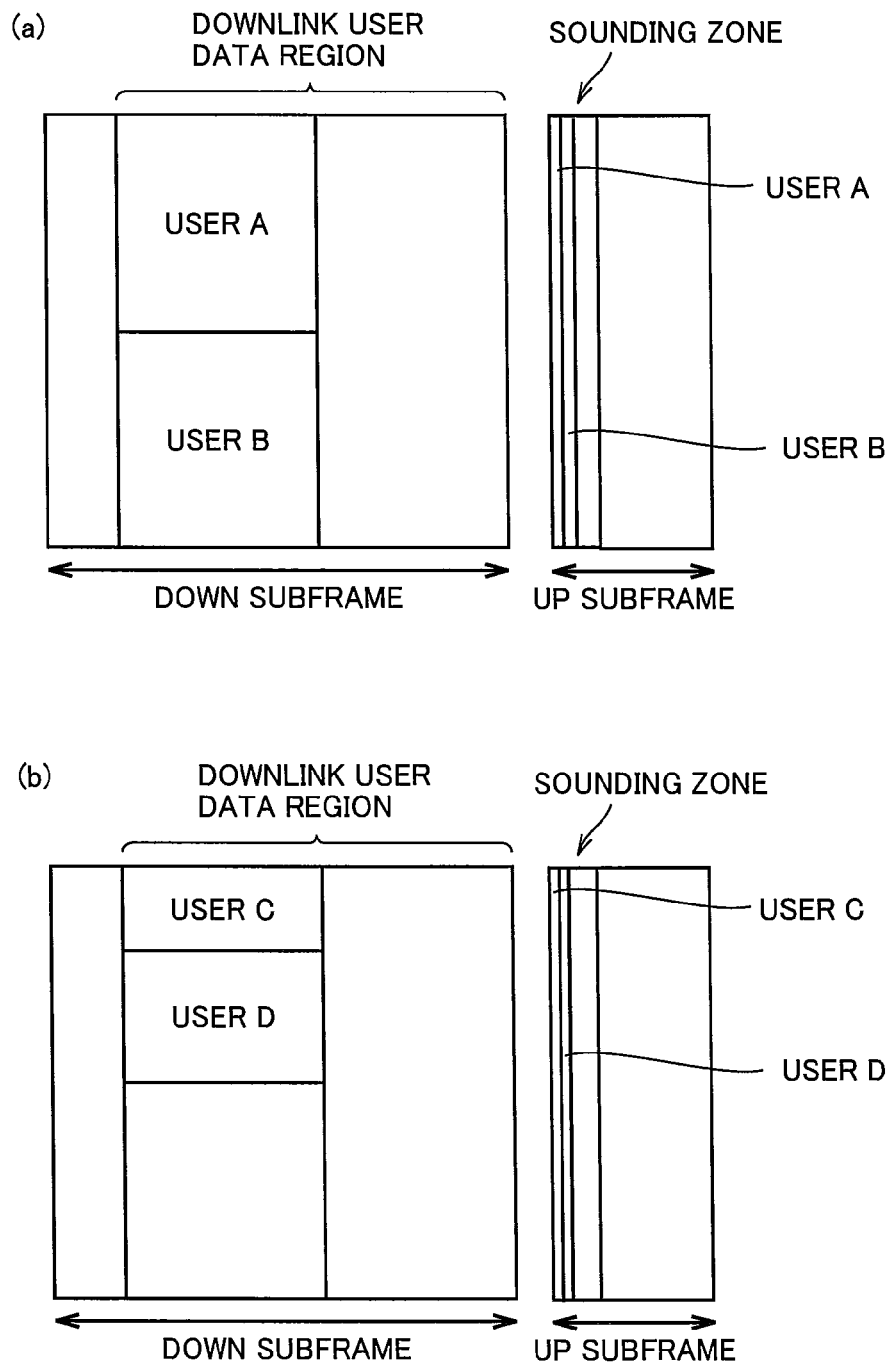
FIG. 15 represents at (a) an OFDMA frame transmitted/received to/from wireless base station #1 of FIG. 14, and represents at (b) an OFDMA frame transmitted/received to/from wireless base station #2 of FIG. 14.

FIG. 15 represents at (a) an OFDMA frame transmitted/received to/from wireless base station #1, and represents at (b) an OFDMA frame transmitted/received to/from wireless base station #2. Users A, B, C, and D each transmit the sounding signal including at least some frequencies (subcarriers) of the frequencies (subcarriers) of the assigned downlink user data region, in the sounding zone of the up subframe. The wireless base station receives the sounding signal from each user (step S302).

Evaluation value processing unit 64 selects an unselected user (wireless terminal) from among the new user and users making communication in the station of concern (step S303).

Evaluation value processing unit 64 extracts the reception response vector from the sounding signal received at step S302. Evaluation value processing unit 64 sequentially selects users to be paired with the selected user from among a plurality of terminals as transmission sources of sounding signals. Evaluation value processing unit 64 generates the reception response vector for each pair. Evaluation value processing unit 64 calculates spatial correlation coefficient C from the reception response vector. Evaluation value processing unit 64 calculates average spatial correlation coefficient M_SR that is the average of the calculated spatial correlation coefficient C for every plurality of subcarriers over all the subcarriers included in the sounding zone. For all the possible pairs, evaluation value processing unit 64 specifies a pair presenting minimum average spatial correlation coefficient M_SR and minimum value MINSR (step S304).

If minimum value MINSR specified at step S304 is less than or equal to TH1 (YES at step S305), transmission scheme setting unit 65 instructs multi-antenna transmission signal processor 24 to make downlink communication with the selected user under the adaptive array transmission scheme. In this case, beam is directed to the selected user, and null is directed to the other user of the pair specified at step S304.

Figure 16:
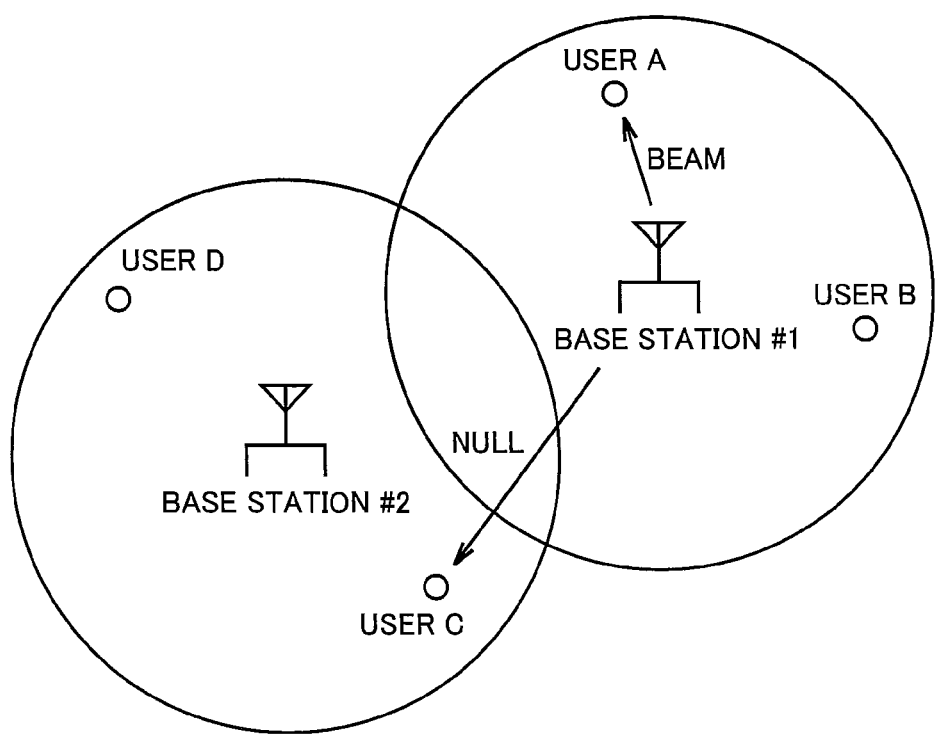
FIG. 16 represents an example of a transmission scheme of wireless base station #1 of FIG. 14.

When the selected user is user A and constitutes a pair with user C, and if their average spatial correlation coefficient M_SR is the minimum, the adaptive array transmission scheme is set as the downlink communication system to user A, and beam is directed to user C and null is directed to user D, as shown in FIG. 16 (step S306).

If minimum value MINSR specified at step S304 exceeds threshold TH1 (NO at step S305), transmission scheme setting unit 65 instructs multi-antenna transmission signal processor 24 to make downlink communication with the selected user under the beamforming dedicated transmission scheme (step S307).

Evaluation value processing unit 64 returns to step S303 if there is an unselected user (wireless terminal) among the new user and users making communication in the station of concern (NO at step S308).

(Effects)

As described above, similarly to the first embodiment, the present embodiment recognizes a characteristic of a transmission path by the sounding signal (known signal) transmitted from a terminal, and if the effect of null steering transmission to an interfering terminal cannot be achieved, specializes in the beamforming dedicated transmission toward a desired terminal without conducting null steering transmission. Accordingly, performance degradation in a cell of concern can be avoided, and improved frequency utilization efficiency in the whole system can be achieved. Moreover, according to the present embodiment, after assigning the downlink user data region to a wireless terminal by a downlink schedule, the transmission scheme to that wireless terminal can be set.

Fourth Embodiment (Configuration)

Figure 17:
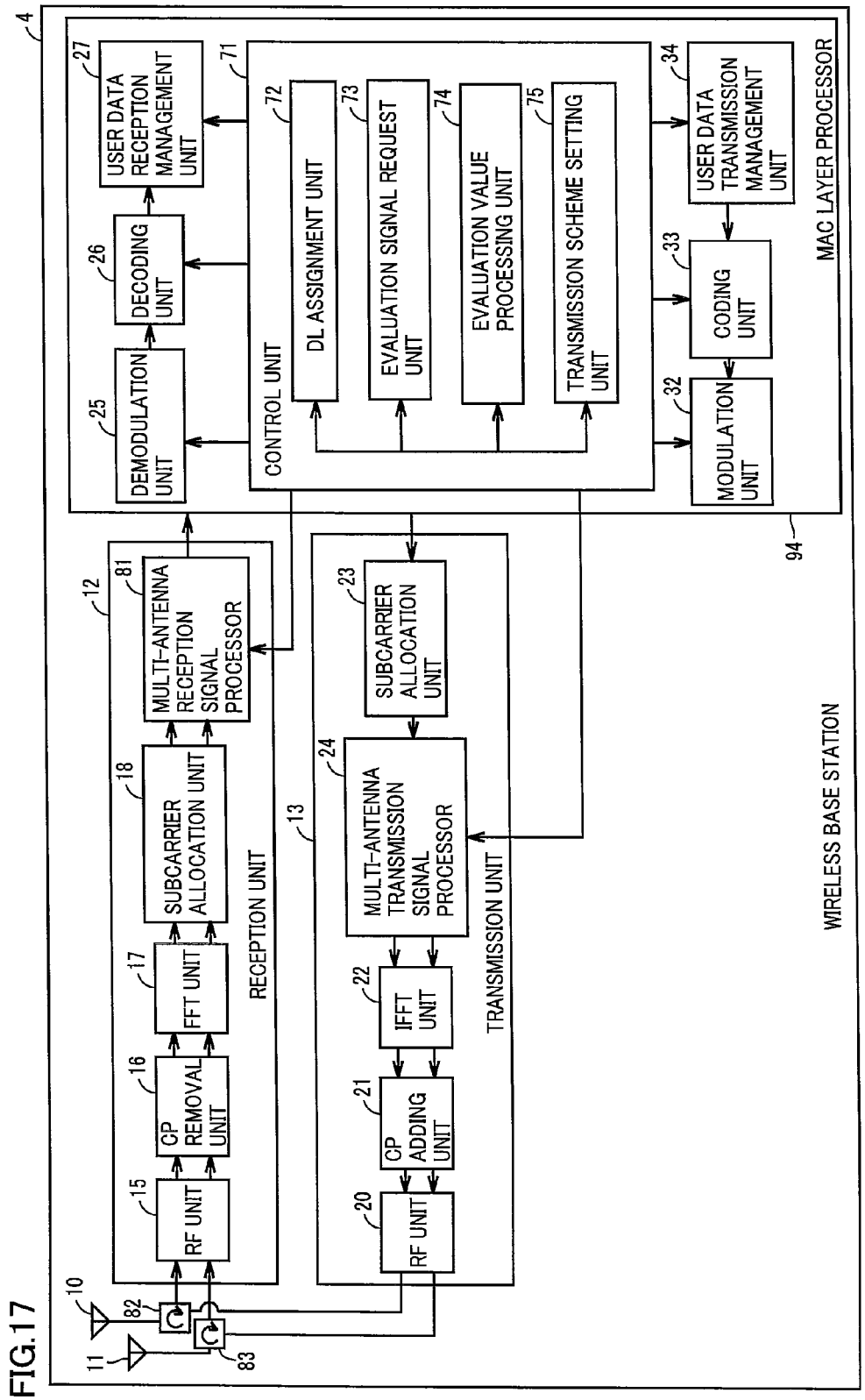
FIG. 17 represents a configuration of a wireless base station according to a fourth embodiment.

FIG. 17 represents a configuration of a wireless base station (communication apparatus) according to a fourth embodiment.

A wireless base station 4 of FIG. 17 is different from the wireless base station of FIG. 1 according to the first embodiment in the following points.

A control unit 71 includes a DL assignment unit 72, an evaluation signal request unit 73, an evaluation value processing unit 74, and a transmission scheme setting unit 75.

If a new user (terminal) requests downlink communication, DL assignment unit 72 assigns a downlink user data region to the new user and a user making communication by proportional fairness.

Evaluation signal request unit 73 instructs the new user and the user making communication to transmit the evaluation signal in the uplink user data region including at least some frequencies (subcarriers) of the frequencies (subcarriers) of the assigned downlink user data region. Evaluation signal request unit 73 receives the evaluation signal continuously transmitted by the new user and the user making communication in the instructed uplink user data region. If the uplink user data region identical to that assigned to the new user and the user making communication is assigned to users (terminals) communicating with another wireless base station, evaluation signal request unit 73 receives the evaluation signals transmitted by these users (terminals) as interference waves.

Evaluation value processing unit 74 calculates EVM (Error Vector Magnitude) from an IQ signal prior to subjecting the evaluation signal received in the uplink user data region instructed to the selected user to adaptive array reception processing in multi-antenna reception signal processor 81, and sets this to EVM1. Evaluation value processing unit 74 also calculates EVM from the IQ signal after subjecting the evaluation signal received in the uplink user data region instructed to the selected user in multi-antenna reception signal processor 81, and sets this to EVM2.

If the difference between EVM1 and EVM2 exceeds threshold TH2, transmission scheme setting unit 75 instructs multi-antenna transmission signal processor 24 to make downlink communication with the selected user under the adaptive array transmission scheme.

If the difference between EVM1 and EVM2 is less than or equal to TH2, transmission scheme setting unit 75 instructs multi-antenna transmission signal processor 24 to make downlink communication with the selected user under the beamforming dedicated transmission scheme.

(Operation)

Figure 18:
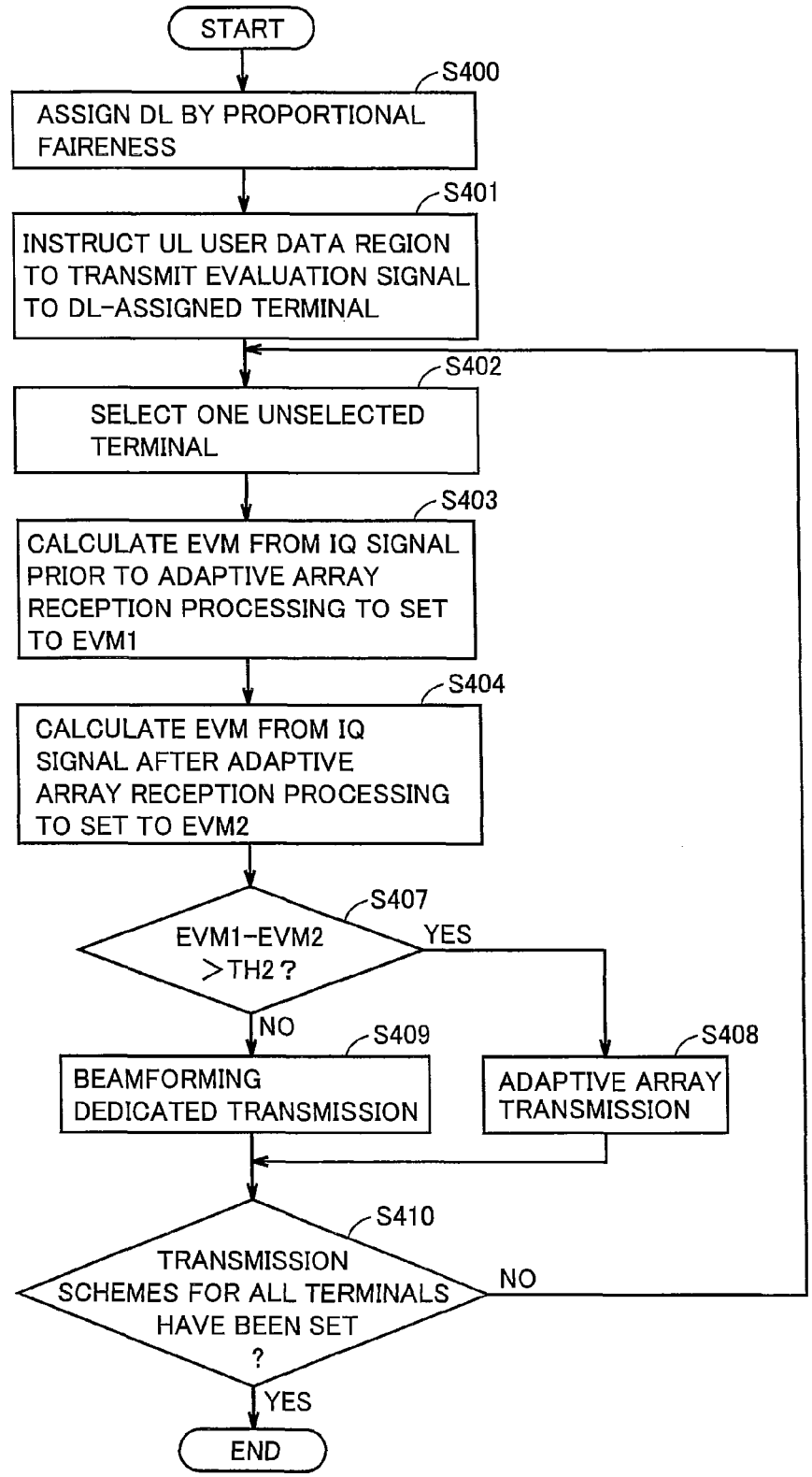
FIG. 18 is a flowchart showing a procedure for deciding a transmission scheme for downlink communication conducted by the wireless base station according to the fourth embodiment.

FIG. 18 is a flowchart showing a procedure for deciding a transmission scheme for downlink communication conducted by the wireless base station according to the fourth embodiment.

Referring to FIG. 18, if a new user (terminal) requests downlink communication, DL assignment unit 72 first assigns a downlink user data region to the new user and a user making downlink communication by proportional fairness (step S400).

Next, evaluation signal request unit 73 instructs the new user and the user making communication to transmit the evaluation signal in the uplink user data region including at least some frequencies (subcarriers) of the frequencies (subcarriers) of the assigned downlink user data region.

The new user and the user making communication each continuously transmit the evaluation signal in the instructed uplink user data region. If this uplink user data region is assigned to a user (terminal) communicating with another wireless base station, the user continuously transmits the evaluation signal in this uplink user data region.

Figure 19:
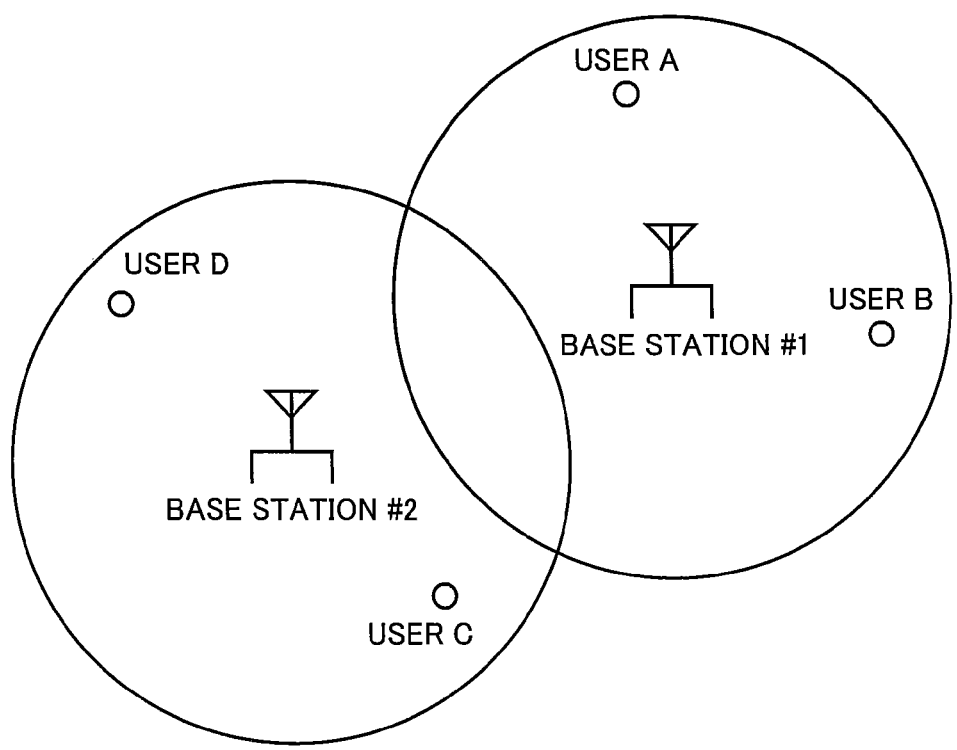
FIG. 19 represents an example of communication connection according to the fourth embodiment.

For example, as shown in FIG. 19, it is assumed that wireless base station #1 is communicating with user A and wireless base station #2 is communicating with users C and D. It is assumed that new user B has requested downlink communication from wireless base station #1.

Figure 20:
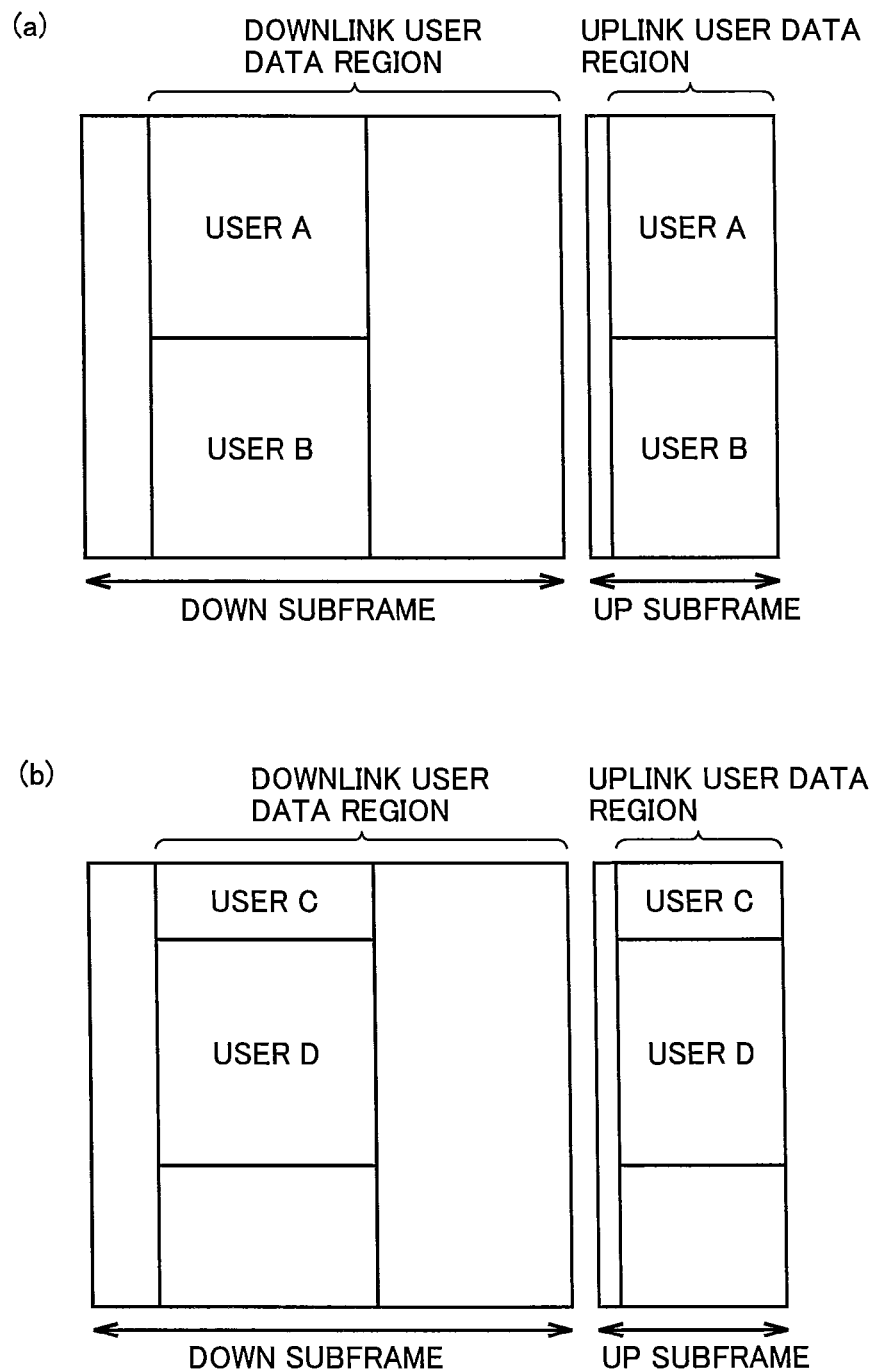
FIG. 20 represents at (a) an OFDMA frame transmitted/received to/from wireless base station #1 of FIG. 19, and represents at (b) an OFDMA frame transmitted/received to/from wireless base station #2 of FIG. 19.

FIG. 20 represents at (a) an OFDMA frame transmitted/received to/from wireless base station #1, and represents at (b) an OFDMA frame transmitted/received to/from wireless base station #2. Users A, B, C, and D each transmit the evaluation signal in the uplink user data region including at least some frequencies (subcarriers) of the frequencies (subcarriers) of the assigned downlink user data region (step S401).

Evaluation value processing unit 74 selects an unselected user (wireless terminal) from among the new user and users making communication in the station of concern (step S402).

Evaluation value processing unit 74 calculates EVM (Error Vector Magnitude) from an IQ signal prior to subjecting the evaluation signal received in the uplink user data region instructed to the selected user to adaptive array reception processing in multi-antenna reception signal processor 81, and sets this to EVM1 (step S403).

Next, evaluation value processing unit 74 calculates EVM from the IQ signal after subjecting the evaluation signal received in the uplink user data region instructed to the selected user to adaptive array reception processing in multi-antenna reception signal processor 81, and sets this to EVM2 (step S404).

If the difference between EVM1 and EVM2 exceeds threshold TH2 (YES at step S407), transmission scheme setting unit 75 instructs multi-antenna transmission signal processor 24 to make downlink communication with the selected user under the adaptive array transmission scheme.

Figure 21:
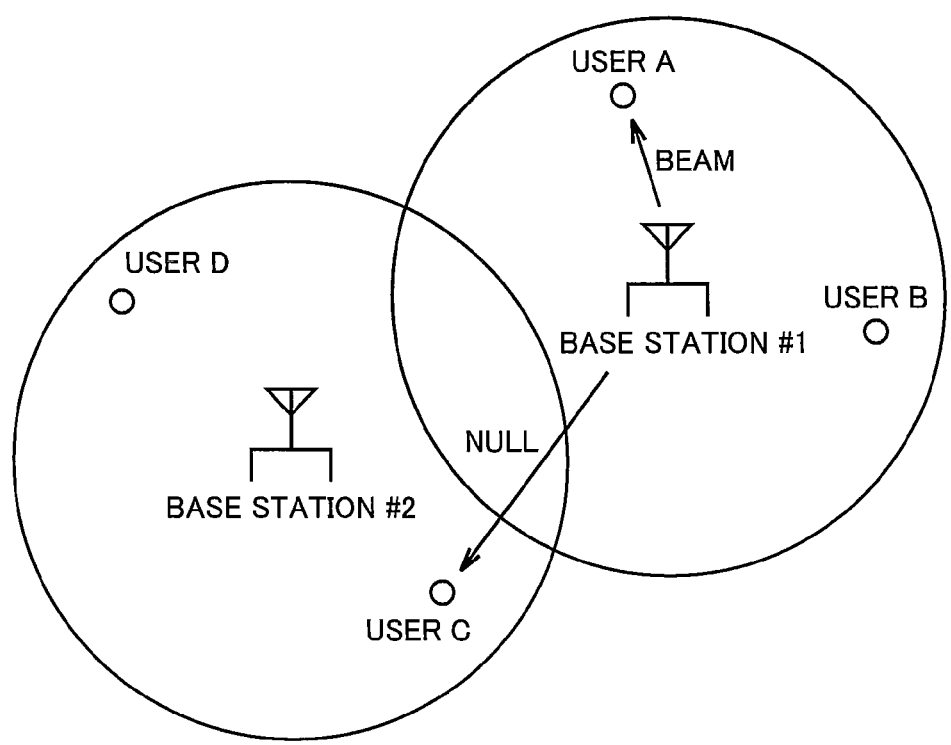
FIG. 21 represents an example of a transmission scheme of wireless base station #1 of FIG. 19.

If the difference between EVM1 and EVM2 exceeds threshold TH2, as shown in FIG. 21, the adaptive array transmission scheme is set as the downlink communication scheme to user B, and beam is directed to user B and null is directed to user D (step S408).

If the difference between EVM1 and EVM2 is less than or equal to threshold TH2 (NO at step S407), transmission scheme setting unit 75 instructs multi-antenna transmission signal processor 24 to make downlink communication with the selected user under the beamforming dedicated transmission scheme (step S409).

Evaluation value processing unit 74 returns to step S402 if there is an unselected user (wireless terminal) among the new user and users making communication in the station of concern (NO at step S410).

(Effects)

As described above, similarly to the second embodiment, the present embodiment recognizes the effects achieved by subjecting a signal transmitted from a terminal to adaptive array reception, and if the effect of null steering transmission to an interfering terminal cannot be achieved, specializes in the beamforming dedicated transmission toward a desired terminal without conducting null steering transmission. Accordingly, performance degradation in a cell of concern can be avoided, and improved frequency utilization efficiency in the whole system can be achieved. Moreover, according to the present embodiment, after assigning the downlink user data region to a wireless terminal with a downlink schedule, the transmission scheme to that wireless terminal can be set.

(Modification)

The embodiments of the present invention are not limited to the above-described embodiments, and may include modifications set forth below, for example.

(1) Reception Quality

In the embodiments of the present invention, EVM is used to represent the quality of received signal, however, this is not a limitation. Instead of EVM, CINR may be used, for example.

(2) Downlink Scheduling Algorithm

In the embodiments of the present invention, proportional fairness is used as a downlink scheduling algorithm, but this is not a limitation. A round-robin system of sequentially assigning a slot for each wireless terminal may be used, for example.

(3) Application to Wireless Terminal

The procedure for setting the communication scheme described in the embodiments of the present invention is applicable not only to a wireless base station but also to a wireless terminal. The procedure for setting the communication scheme according to the embodiments of the present invention is also applicable to LTE, PHS or the like.

(4) Sounding Signal

In the second and fourth embodiments, a sounding (known) signal may be transmitted as an evaluation signal in the uplink user data region.

It is to be understood that the embodiments disclosed herein are only by way of example, and is not to be taken by way of limitation. The scope of the present invention is not limited by the description above, but rather by the terms of the appended claims, and is intended to include any modification within the scope and meaning equivalent to the terms of the claims.

REFERENCE SIGNS LIST 10, 11 antenna; 12 reception unit; 13 transmission unit; 15, 20 RF unit; 16 CP removal unit; 17 FFT unit; 18, 23 subcarrier allocation unit; 21 CP adding unit; 22 IFFT unit; 24 multi-antenna transmission signal processor; 25 demodulation unit; 26 decoding unit; 27 user data reception management unit; 32 modulation unit; 33 coding unit; 34 user data transmission management unit; 41, 51, 61, 71 control unit; 42, 52, 62, 72 DL assignment unit; 43, 53, 63, 73 evaluation signal request unit; 44, 54, 64, 74 evaluation value processing unit; 45, 55, 65, 75 transmission scheme setting unit; 81 multi-antenna reception signal processor; 82, 83 circulator; 91, 92, 93, 94 MAC layer processor.

The invention claimed is:

1. A communication apparatus comprising:
an evaluation value processing unit configured to calculate, upon receipt of known signals from a plurality of communication devices including a communication partner device, an evaluation value indicative of a characteristic of a transmission path based on the known signals from said plurality of communication devices; and
a transmission scheme setting unit configured to, based on said evaluation value, select between an adaptive array transmission scheme that utilizes both null steering and beamforming and an adaptive array transmission scheme that utilizes beamforming without null steering, and sets the selected adaptive array transmission scheme as a transmission scheme to the communication partner device.

2. The communication apparatus according to claim 1, further comprising an evaluation signal request unit configured to cause said communication partner device to transmit a known signal including frequencies identical to at least some of frequencies of a signal to be transmitted to said communication partner device.

3. The communication apparatus according to claim 1, wherein a communication scheme with said communication partner device is an OFDMA scheme, and said known signal is a signal transmitted in a sounding zone in an OFDMA frame.

4. The communication apparatus according to claim 1, wherein a communication scheme with said communication partner device is an OFDMA scheme, said communication apparatus further comprising:
an assignment unit configured to determine a first user data region to be transmitted to the communication partner device based on a downlink scheduling algorithm; and
an evaluation signal request unit configured to cause said communication partner device to transmit a known signal including subcarriers identical to those of said first user data region.

5. A communication apparatus comprising:
an evaluation value processing unit configured to calculate, upon receipt of known signals from a plurality of communication devices including a communication partner device, an evaluation value indicative of a characteristic of a transmission path based on the known signals from said plurality of communication devices; and
a transmission scheme setting unit configured to set, based on said evaluation value, one of adaptive array transmission that achieves both null steering and beamforming and beamforming dedicated transmission as a transmission scheme to the communication partner device,
wherein upon receipt of the known signals from the plurality of communication devices including the communication partner device, said evaluation value processing unit sequentially selects other communication devices to be paired with the communication partner device, and calculates, for each pair, the evaluation value indicative of the characteristic of the transmission path based on the known signals from the communication devices constituting the pair, and said transmission scheme setting unit sets, based on said evaluation values for a plurality of pairs, one of said adaptive array transmission and said beamforming dedicated transmission as the transmission scheme to the communication partner device.

6. The communication apparatus according to claim 5, wherein upon receipt of the known signals from the plurality of communication devices, said evaluation value processing unit calculates a reception response vector from each of the known signals from said plurality of communication devices, said evaluation value processing unit sequentially selects other communication devices to be paired with the communication partner device, and calculates, for each pair, a spatial correlation coefficient from said reception response vector as an evaluation value, if the minimum value among the evaluation values of all possible pairs is less than or equal to a predetermined threshold, said transmission scheme setting unit sets said adaptive array transmission as the transmission scheme to the communication partner device, and if the minimum value exceeds the predetermined threshold, said transmission scheme setting unit sets said beamforming dedicated transmission as the transmission scheme to the communication partner device, and in said adaptive array transmission, beam is directed to said communication partner device, and null is directed to the other device of a pair by which said evaluation value is the maximum.

7. The communication apparatus according to claim 6, further comprising:
an assignment unit configured to temporarily assign a first user data region to said communication partner device; and
an evaluation signal request unit configured to cause said communication partner device to transmit a known signal including subcarriers identical to those of said first user data region,
wherein if the minimum value among the evaluation values of all possible pairs is less than or equal to the predetermined threshold, and if the minimum value among the evaluation values of all possible pairs exceeds the predetermined threshold and said temporarily assigned first user data region cannot be changed, said assignment unit formally assigns said temporarily assigned first user data region.

8. A communication apparatus comprising:
an evaluation value processing unit configured to calculate, upon receipt of known signals from a plurality of communication devices including a communication partner device, an evaluation value indicative of a characteristic of a transmission path based on the known signals from said plurality of communication devices; and
a transmission scheme setting unit configured to set, based on said evaluation value, one of adaptive array transmission that achieves both null steering and beamforming and beamforming dedicated transmission as a transmission scheme to the communication partner device,
wherein said evaluation value processing unit calculates first communication quality when the known signal from the communication partner device is not subjected to adaptive array reception processing and second communication quality when the known signal from said communication partner device is subjected to adaptive array reception processing, and if a difference between said first communication quality and said second communication quality exceeds a predetermined threshold, said transmission scheme setting unit sets said adaptive array transmission as the transmission scheme to said communication partner device, and if the difference is less than or equal to the predetermined threshold, said transmission scheme setting unit sets said beamforming dedicated transmission as the transmission scheme to said communication partner device.

9. The communication apparatus according to claim 8, wherein said first communication quality and said second communication quality are Error Vector Magnitude (EVM).

10. The communication apparatus according to claim 8, wherein a communication scheme with said communication partner device is an OFDMA scheme, and said known signal is a signal transmitted in an uplink user data region in an OFDMA frame.

11. A communication apparatus comprising:
an evaluation value processing unit configured to calculate first communication quality when an evaluation signal from a communication partner device is not subjected to adaptive array reception processing and second communication quality when the evaluation signal from the communication partner device is subjected to adaptive array reception processing, and
a transmission scheme setting unit configured to, if a difference between said first communication quality and said second communication quality exceeds a predetermined threshold, set adaptive array transmission that achieves both null steering and beamforming as a transmission scheme to said communication partner device, and if the difference is less than or equal to the predetermined threshold, set beamforming dedicated transmission as the transmission scheme to said communication partner device.

12. The communication apparatus according to claim 11, further comprising an evaluation signal request unit configured to cause said communication partner device to transmit a signal including frequencies identical to at least some of frequencies of a signal to be transmitted to said communication partner device, as an evaluation signal.

13. The communication apparatus according to claim 11, wherein a communication scheme with said communication partner device is an OFDMA scheme, and said evaluation signal is a signal transmitted in a sounding zone in an OFDMA frame.

14. The communication apparatus according to claim 11, wherein a communication scheme with said communication partner device is an OFDMA scheme, and said evaluation signal is a signal transmitted in an uplink user data region in an OFDMA frame.

15. The communication apparatus according to claim 11, wherein said first communication quality and said second communication quality are Error Vector Magnitude (EVM).

16. The communication apparatus according to claim 11, wherein a communication scheme with said communication partner device is an OFDMA scheme, said communication apparatus further comprising:
an assignment unit configured to determine a first user data region to be transmitted to the communication partner device based on a downlink scheduling algorithm; and
an evaluation signal request unit configured to cause said communication partner device to transmit the evaluation signal in a second user data region including subcarriers identical to those of said first user data region,
wherein said evaluation value processing unit receives the evaluation signal transmitted in said second user data region and calculates said first communication quality and said second communication quality of said received evaluation signal.

17. The communication apparatus according to claim 11, wherein a communication scheme with said communication partner device is an OFDMA scheme, said communication apparatus further comprising:
an assignment unit configured to temporarily assign a first user data region to said communication partner device; and
an evaluation signal request unit configured to cause said communication partner device to transmit the evaluation signal in a second user data region including subcarriers identical to those of said first user data region,
wherein said evaluation value processing unit receives the evaluation signal transmitted in said second user data region and calculates said first communication quality and said second communication quality of said received evaluation signal, and if the difference between said first communication quality and said second communication quality exceeds a predetermined threshold, and if the difference between said first communication quality and said second communication quality is less than or equal to the predetermined threshold and the temporarily assigned first user data region cannot be changed, said assignment unit formally assigns said temporarily assigned first user data region.

18. A communication method comprising the steps of:
upon receipt of known signals from a plurality of communication devices including a communication partner device, calculating an evaluation value indicative of a characteristic of a transmission path based on the known signals from said plurality of communication devices;
based on said evaluation value, selecting between an adaptive array transmission scheme that utilizes both null steering and beamforming and an adaptive array transmission scheme that utilizes beamforming without null steering; and
setting the selected adaptive array transmission scheme as a transmission scheme to the communication partner device.

* * * * *